(12) United States Patent
Nishiguchi et al.

(10) Patent No.: US 11,112,358 B2
(45) Date of Patent: Sep. 7, 2021

(54) BRILLOUIN SCATTERING MEASUREMENT METHOD AND BRILLOUIN SCATTERING MEASUREMENT DEVICE

(71) Applicant: Neubrex Co., Ltd., Kobe (JP)

(72) Inventors: Kenichi Nishiguchi, Kobe (JP); Kinzo Kishida, Kobe (JP); Yahei Koyamada, Tokyo (JP)

(73) Assignee: NEUBREX CO., LTD., Kobe (JP)

( * ) Notice: Subject to any disclaimer, the term of this patent is extended or adjusted under 35 U.S.C. 154(b) by 265 days.

(21) Appl. No.: 16/341,263

(22) PCT Filed: Nov. 1, 2016

(86) PCT No.: PCT/JP2016/082437
§ 371 (c)(1),
(2) Date: Apr. 11, 2019

(87) PCT Pub. No.: WO2018/083732
PCT Pub. Date: May 11, 2018

(65) Prior Publication Data
US 2020/0041411 A1 Feb. 6, 2020

(51) Int. Cl.
| G01N 21/63 | (2006.01) |
| G01B 11/16 | (2006.01) |
| G01D 5/353 | (2006.01) |
| G01K 11/32 | (2021.01) |
| G01K 11/322 | (2021.01) |

(52) U.S. Cl.
CPC ........... *G01N 21/636* (2013.01); *G01B 11/16* (2013.01); *G01D 5/35364* (2013.01); *G01K 11/32* (2013.01); *G01K 11/322* (2021.01); *G01N 2021/638* (2013.01)

(58) Field of Classification Search
CPC ........... G01N 21/636; G01N 2021/638; G01B 11/16; G01D 5/35364; G01K 11/32; G01K 11/322
See application file for complete search history.

(56) References Cited

U.S. PATENT DOCUMENTS

2011/0228255 A1* 9/2011 Li ................. G01K 11/32
356/33

FOREIGN PATENT DOCUMENTS

JP 2012063146 A 3/2012

OTHER PUBLICATIONS

International Search Report (PCT/ISA/210) dated Nov. 29, 2016, Japanese by the Patent Office as the International Searching Authority for International Application No. PCT/JP2016/082437.

(Continued)

*Primary Examiner* — Georgia Y Epps
*Assistant Examiner* — Don J Williams
(74) *Attorney, Agent, or Firm* — Buchanan Ingersoll & Rooney PC

(57) ABSTRACT

In a measurement requiring a high space resolution using S-BOTDR, a pulse train composed of a plurality of pulses having the interval between the pulses longer than the phonon lifetime is interpulse-code-modulated. A Golay code is used for the interpulse code modulation to eliminate the sidelobes of the correlation in using a technique of correlation. In a technique without using correlation, an Hadamard matrix is used for the interpulse code modulation and the resultant matrix is inverted in the signal processing.

8 Claims, 19 Drawing Sheets

(56) References Cited

OTHER PUBLICATIONS

Matsuura et al., "Enhancing performance of Double-Pulse BOTDR", IEICE Trans. B, vol. J97-B, No. 10, (in Japanese), 2014, pp. 962-972.

Nishiguchi et al., "Synthetic Spectrum Approach for Brillouin Optical Time-Domain Reflectometry", Sensors, vol. 14, 2014, pp. 4731-4754.

Shibata et al., "Proposal and Demonstration of High Spatial Resolution BOTDR by Correlating Signals Sampled with Narrow-And Wide-Width Window Functions", IEEE 6th International Conference on Photonics (ICP), 2016, 3 pages.

Soto et al., "Performance improvement in Brillouin-based simultaneous strain and temperature sensors employing pulse coding incoherent detection schemes", OSA/OFC/NFOEC 2009, 3 pages.

Wan et al., "The theoretical analysis and design of coding BOTDR system with APD detector", IEEE Sensors J., vol. 14, No. 8, Aug. 2014, pp. 2626-2632.

\* cited by examiner

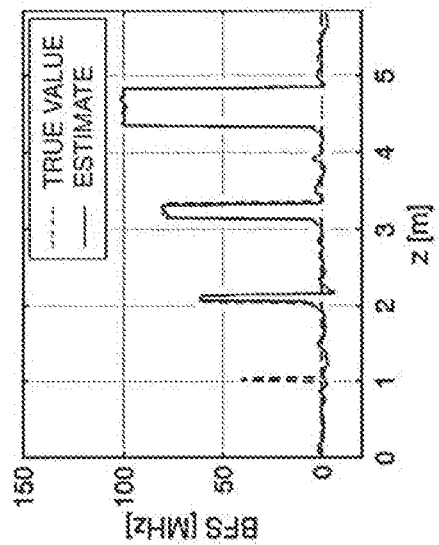
FIG. 13A
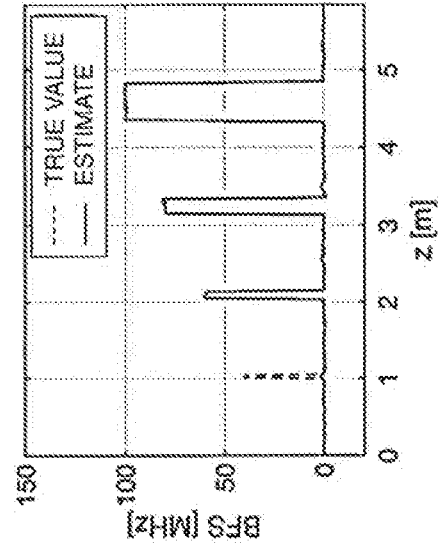
FIG. 13B
FIG. 13C
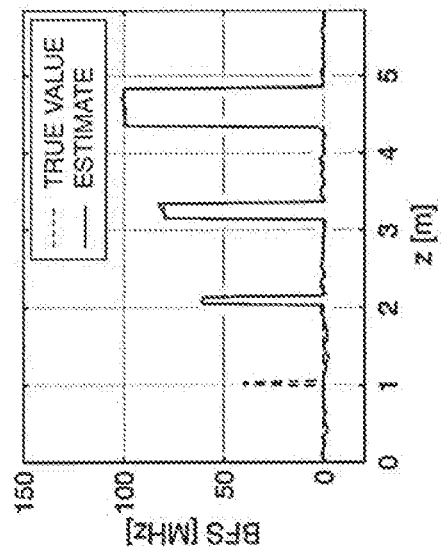
FIG. 13D

BRILLOUIN SCATTERING MEASUREMENT METHOD AND BRILLOUIN SCATTERING MEASUREMENT DEVICE

TECHNICAL FIELD

The present application relates to measurement methods and measurement systems for measuring distribution of temperature and strain of a measurement object utilizing Brillouin scattering in an optical fiber, and particularly relates to a measurement method and a measurement system that measure the distributions with a high space resolution by means of Brillouin optical time-domain reflectometry (BOTDR).

BACKGROUND ART

The BOTDR measures distributions of strain and temperature by means of Brillouin scattered light generated by a probe light, which is an optical pulse (abbreviated as "pulse" hereinafter), injected into an optical fiber from one end thereof, and suitable for a long-distance measurement. However, the space resolution of the BOTDR is as coarse as about 1 m, and there has been a dilemma in that shortening the pulse duration to increase the space resolution results in broadening of the spectrum and making it impossible to increase accuracy of measurement of the Brillouin frequency shift (abbreviated as "BFS" hereinafter), which is a basic quantity for this measurement technique.

To improve conventional BOTDRs, there are proposed recently new techniques, such as a double pulse BOTDR (DP-BOTDR) using two short duration pulses (abbreviated as "short pulse" hereinafter), and a synthetic BOTDR (S-BOTDR) and a phase shift pulse BOTDR (PSP-BOTDR) both using a composite pulse combined with a long duration pulse (abbreviated as "long pulse" hereinafter) and a short pulse, whereby a high space resolution has become possible.

Among them, the DP-BOTDR is capable of achieving a high space resolution; however, it needs a measurement signal with a high SN ratio to obtain the Brillouin frequency shift with accuracy because other than the true peak, a number of peaks having levels close to that of the true peak appear concurrently in the spectrum. On the other hand, the S-BOTDR is capable of obtaining a spectrum close to a Lorentzian spectrum by synthesizing the spectra obtained from four kinds of BOTDR measurements using four kinds of composite probe lights combined with a short pulse and a long pulse with phase difference, whereby not only space resolution but also frequency resolution is improved. Experimentally, a space resolution of 10 cm was demonstrated. Furthermore, the PSP-BOTDR, which is a simplified technique of the S-BOTDR, is capable of obtaining a spectrum with both high space resolution and high frequency resolution using two kinds of composite probe lights combined with a short pulse and a long pulse.

In measurements utilizing Brillouin scattering, since Brillouin scattered light is faint and only a signal comparable in strength to noise is obtained in single measurement, it is necessary to accumulate or average the signal by repeating the measurement multiple times. In order to ensure an SN ratio of 20 dB, the measurement needs to be repeated, for example, ten thousand times. In addition to this, a spectrum of the BOTDR follows a Rayleigh distribution and varies largely in itself because the BOTDR measures a spectrum of random vibration of phonon in the optical fiber. For that reason, multiple repetitions of the measurement are also needed to reduce fluctuations of the variation.

The S-BOTDR and the PSP-BOTDR employ a technique of synthesizing the spectrum to achieve a high space resolution. Although accumulation of the spectrum reduces the fluctuations in the synthetic spectrum, it needs the measurement to be repeated more times than conventional BOTDR. This is a weak point of the synthesis technique. Therefore, it is important to improve the SN ratio to overcome the weak point.

Generally, in order to improve the SN ratio while keeping the space resolution, coding techniques are used, in which an intrapulse code-modulated long pulse or an interpulse code-modulated long pulse train is used and decoding is performed in the signal processing. These techniques are roughly classified into a technique based on correlation and that using inversion of matrix without using the correlation. The correlation-based techniques use coding such as a Barker code, an M sequence, and a Golay code, and they have a property in that the coefficients of autocorrelation of the code sequence are close to the delta function. Among them, only Golay code renders the correlation values, in other words, the sidelobes, to complete zero except for that at zero time lag. The technique of intrapulse modulation of the long pulse using these codes is referred to as "pulse compression" in the field of radar. On the other hand, a technique without using correlation uses an Hadamard matrix composed of a code sequence, in which measurements are carried out correspondingly to each row and the matrix inversion and averaging are performed to improve the SN ratio. In particular, a simplex code is composed of "0" and "1", and can implement intensity modulation. This brings about the same effect as using the Golay code.

In an optical time-domain reflectometry (BOTDR) for fiber optic, there are proposed a method of improving the SN ratio using a pule compression technique with a unipolar Golay code and using a simplex technique.

Also in the S-BOTDR, there are proposed a coding method using a simplex technique, which is a technique of improving the SN ratio for a conventional low space-resolution BOTDR (see, for example, Non-Patent Document 1) and a correlation technique using a Golay code (see, for example, Non Patent Document 2). In a BOTDR having a high space resolution, there is proposed a method of improving the SN ratio by an intrapulse modulation of double pulses used in the BOTDR (see, for example, Non Patent Document 3). There is further proposed a method of improving the SN ratio by an intrapulse modulation for the S-BOTDR (see, for example, Patent Document 1).

Non-Patent Documents

Non-Patent Document 1: M. A. Soto et al., "Performance improvement in Brillouin-based simultaneous strain and temperature sensors employing pulse coding incoherent detection schemes", OSA/OFC/NFOEC, 2009;

Non-Patent Document 2: S. Wan et al., "The theoretical analysis and design of coding BOTDR system with APD detector", IEEE Sensors J., Vol. 14, No. 8, pp. 2626-2632, August, 2014;

Non-Patent Document 3: S. Matsuura et al., "Enhancing performance of double-pulse BOTDR", IEICE Trans. B, Vol. J.97-B, No. 10, pp. 962-972, October, 2014 (in Japanese);

Non-Patent Document 4: K. Nishiguchi et al., "Synthetic Spectrum Approach for Brillouin Optical Time-Domain Reflectometry" Sensors, Vol. 14, No. 3, pp. 4731-4754, March 2014; and Non-Patent Document 5: R. Shibata et al., "Proposal and demonstration of high spatial resolution BOTDR by correlating signals sampled with narrow- and wide-width window functions", IEEE 6th International Conference on Photonics (ICP) 2016, March, 2016.

PRIOR ART DOCUMENT

Patent Document

Patent Document 1: JP5493089 B

SUMMARY OF THE INVENTION

Problem that the Invention is to Solve

The fluctuations in the signal of the BOTDR is largely due to a signal from the Rayleigh distribution except due to noise, and the signal fluctuation due to the former has a correlation time comparable to the phonon lifetime unlike the noise. For that reason, an interval of a pulse train has modulated on the basis of a code needed to be larger than the correlation time, and unless the interval is set longer than the correlation time, no effect of reducing the fluctuation is brought about.

The present application is made to resolve the above-described problems, and aimed at providing a Brillouin scattering measurement method and a Brillouin scattering measurement system that use a technique of interpulse code-modulating a pulse train having an interval longer than the phonon lifetime to improve the SN ratio while reducing fluctuations in an S-BOTDR. Particularly in Brillouin measurement, since a time-varying spectrum is necessary to be measured with accuracy, the characteristic that the sidelobes of the correlation become zero is important. Hence, a point to be implemented in using a Golay code for the Brillouin measurement is described. Furthermore, since the interpulse code modulation with an Hadamard matrix and a technique of inverting the matrix in the signal processing also bring about the same effect as using the Golay code, a technique of improving the SN ratio using the Hadamard matrix in the S-BOTDR is also described.

Means for Solving the Problem

A Brillouin scattering measurement method according to the present application that that uses a composite pulse train composed of composite pulses with an interval of the composite pulse train being longer than a phonon lifetime; each composite pulse being formed of two kinds of optical pulses having different durations generated from a laser light from a laser source, by combining both optical pulses as a pair to be located at respective predetermined time positions; and injects the composite pulse train into one end of an optical fiber provided to a measurement object, to measure physical quantities of the measurement object from frequency shift change of Brillouin backscattered light generated by the composite pulse train in the optical fiber, the Brillouin scattering measurement method comprising the steps of phase modulating one of the optical pulses on the basis of two Golay code sequences; optically heterodyne-receiving the Brillouin backscattered light from each composite pulse with a reference light from the laser light source, to output as a first signal; heterodyne-receiving the first signal with a signal having a predetermined frequency and then passing the heterodyne-received signal through two kinds of low-pass filters corresponding to the optical pulses, to output the filtered signals as second signals; calculating, for each Golay code sequence, cross-spectrum of one of the second signals and a complex conjugate signal of the other second signal; calculating a synthetic spectrum from the calculated cross-spectrum; and decoding the synthetic spectrum.

A Brillouin scattering measurement system according to the present application includes a laser light source; a probe light generator configured to generate a probe light for measuring physical quantities of a measurement object, the probe light generator having: a pulse generator generating, from a laser light from the laser light source, two kinds of optical pulses having durations different from each other; a phase selector having a plurality of pieces of phase information based on two Golay code sequences, and selecting a piece of the phase information to be sent; a phase shifter phase-modulating one of the optical pulses to impart to the one optical pulse the pieces of phase information received from the phase selector; and a pulse combiner combining as a pair the phase-modulated pulse and the other pulse and locates both pulses at respective predetermined time positions, an optical heterodyne receiver optically heterodyne-receiving with a reference light from the laser light source a Brillouin backscattered light generated by the probe light injected into an optical fiber provided to the measurement object; a heterodyne receiver heterodyne-receiving the signal output from the optical heterodyne receiver with a signal having a predetermined frequency from an oscillator; and a signal processor passing the signal output from the heterodyne receiver through low-pas filters corresponding to the short pulse and the long pulse, and calculating respective spectra of the filtered signals, to calculate a cross-spectrum of the spectra.

According to the present application, a Brillouin scattering measurement method and a Brillouin scattering measurement system can be provided that is capable of implementing the measurement use either technique of an S-BOTDR and a PSP-BOTDR with a high accuracy and a high space resolution as well as a high SN ratio without being subject to the influence of a Rayleigh distribution contained in the signal specific to the BOTDR.

BRIEF DESCRIPTION OF THE DRAWINGS

FIGS. 13A to 13D are graphs showing estimation results of the BFS simulated for cases of varying measurement repetition count in the S-BOTDR;

EMBODIMENTS FOR CARRYING OUT THE INVENTION

Techniques of the S-BOTDR having been proposed calculate an ideal spectrum by synthesizing four spectra obtained by injecting four kinds of probe lights (see Non-Patent Document 4). However, using four cross-spectra rather than the four spectra facilitates handling of the Brillouin scattering spectrum even in the S-BOTDR, as demonstrated by a proposed PSP-BOTDR that uses cross-spectra (see Non-Patent Document 5). Since a synthetic spectrum obtained finally is the same even using either technique, the S-BOTDR using the cross-spectrum is described hereinafter. Note that while S-BOTDR can be implemented with at least three kinds of probe lights, the S-BOTDR using four kinds of probe lights is particularly described hereinafter in light of extension to a coding technique.

Embodiment 1

Figure 1:
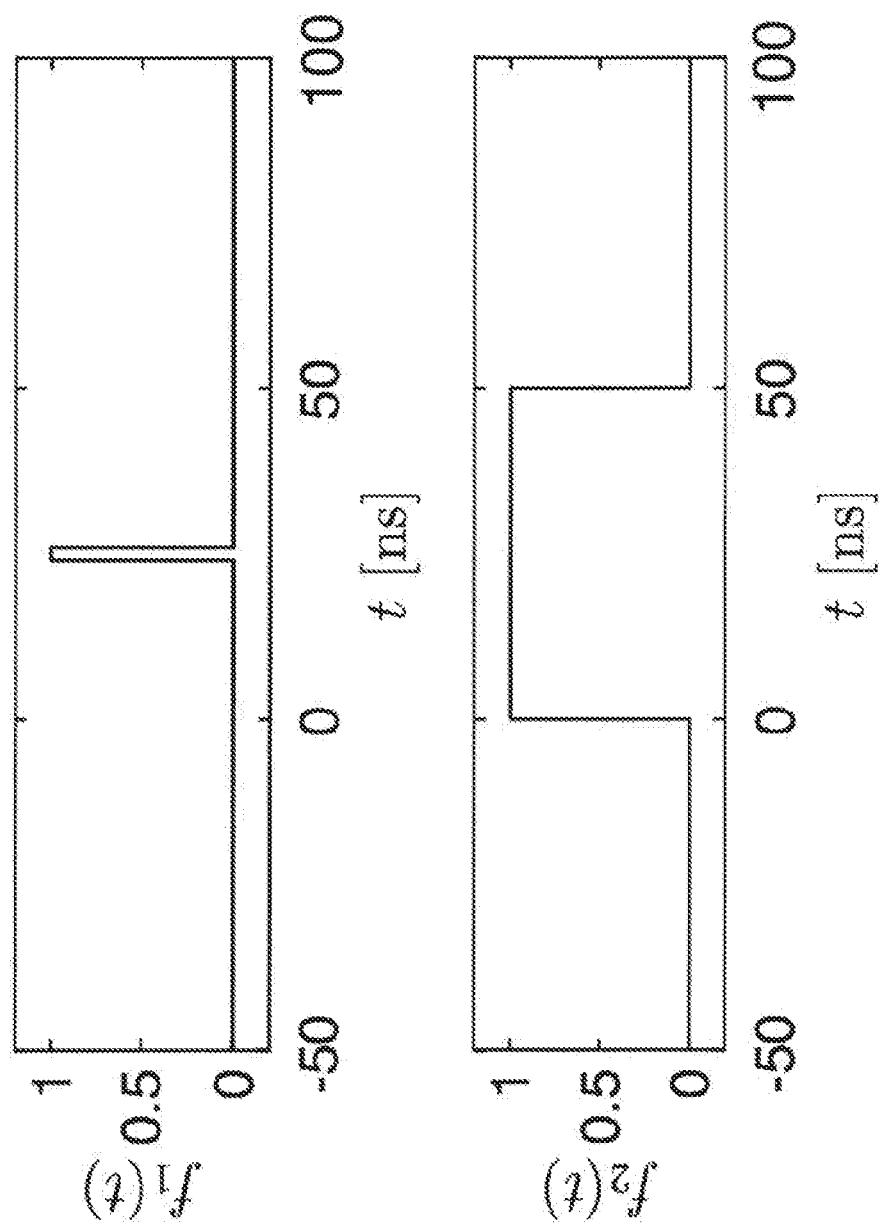
FIG. 1 is a diagram for explaining the shapes of components of a probe light used in an S-BOTDR according to Embodiment 1.

Embodiment 1 of the present application is described below with reference to the drawings and equations.
S-BOTDR Technique A probe light is formed by combining a short pulse and a long pulse as shown in FIG. 1. Duration of the short pulse is determined depending on a desired space resolution; for example, for a case of a desired space resolution being 10 cm, the duration is determined to be 1 ns. Duration of the long pulse is determined on the basis of the phonon lifetime, i.e., a decay time of 10 ns; for example, a duration of 50 ns is given to the long pulse. The pulses are respectively expressed by the following Eqs. (1), (2):

$$f_1(t)=I_{[t_0,t_0+D_1]}(t) \quad (1)$$

$$f_2(t)=I_{[0,D_2]}(t) \quad (2),$$

where $D_1$, $D_2$ are the durations of the short pulse and the long pulse, respectively, and to is a start time of the short pulse. Here, to locate the short pulse at the center of the long pulse, the relation between the start time to and the durations $D_1$, $D_2$ is given by Eq. (3):

$$t_0 = \frac{D_2 - D_1}{2}. \quad (3)$$

Further, $D_1$ is determined as a time width corresponding to the space resolution, and its specific value is determined to be $D_1=2$ ns for, for example, a space resolution of 20 cm. On the other hand, $D_2$ is determined as a time width corresponding to phonon lifetime, and its specific value is determined to be a sufficiently longer than the phonon lifetime (9 ns), for example, $D_2=50$ ns.

The short pulse and the long pulse are overlapped with each other with a phase difference. The way of overlapping is described here by means of a complex plane. Points, whose count is p ($p \geq 3$), are arranged at equal intervals on the unit circle on a complex plane as expressed by Eq. (4):

$$\lambda_j = \exp\left(\frac{2\pi(j-1)}{p}i\right), j = 1, 2, \ldots, p. \quad (4)$$

where i is imaginary unit (square root of −1).

Corresponding to the p points, prepared are p probe lights expressed by the following Eq, (5):

$$f^{(j)}(t)=f_1(t)+r\lambda_j f_2(t), j=1,2,\ldots,p \quad (5),$$

where r is an amplitude ratio between the short pulse and the long pulse, and the argument of $\lambda_j$ denotes the phase difference. Since $\lambda_j$ (j=1, 2, . . . , p) are on the unit circle, the Eq. (6) holds:

$$|\lambda_j|=1 \quad (6).$$

Moreover, the arrangement at equal interval leads to the following Eqs. (7), (8):

$$\sum_{j=1}^{p} \lambda_j = 0 \quad (7)$$

$$\sum_{j=1}^{p} \lambda_j^2 = 0. \quad (8)$$

Figure 2:
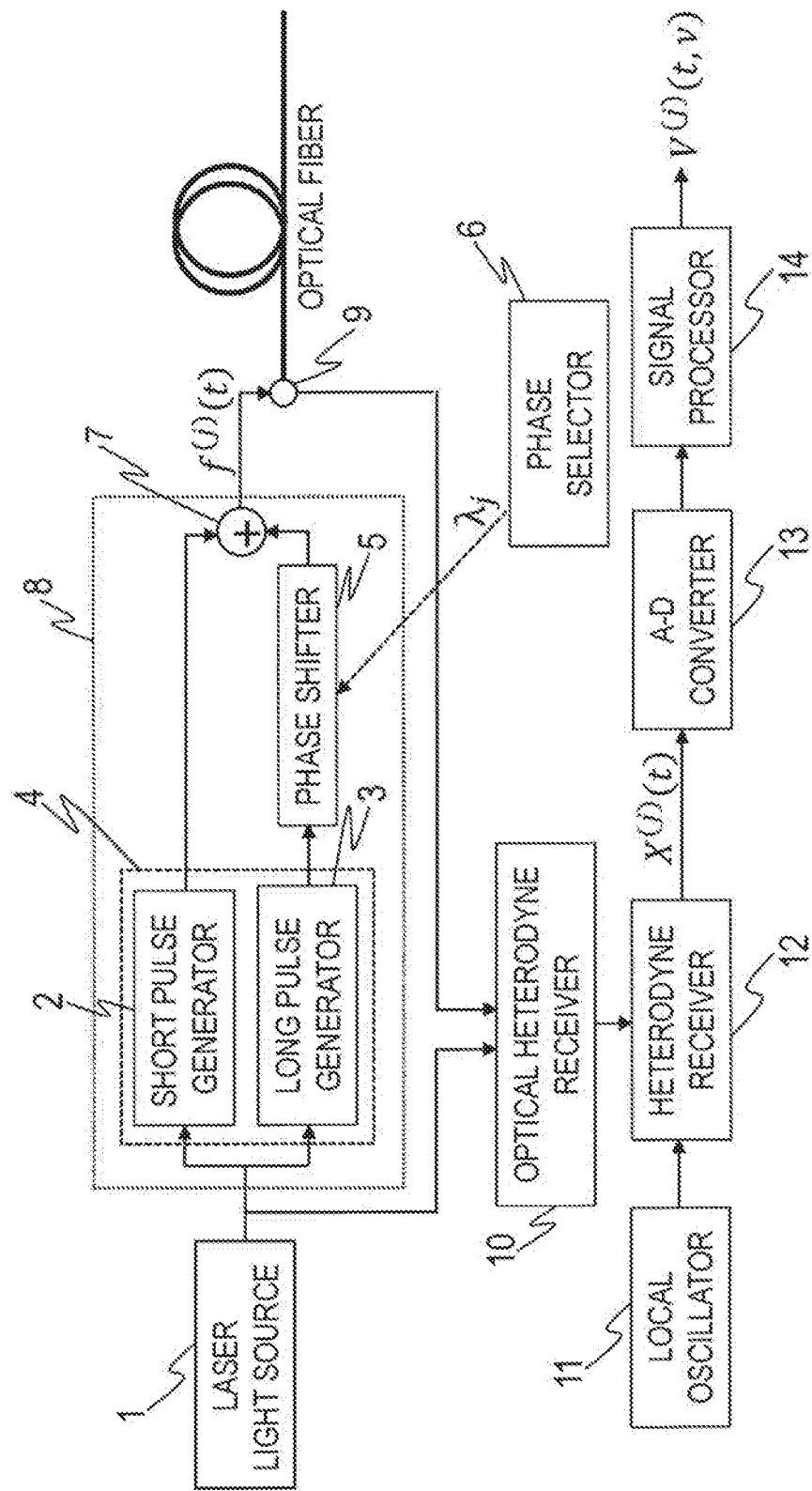
FIG. 2 is a block diagram of a Brillouin scattering measurement system for the S-BOTDR according to Embodiment 1.
Figure 3:
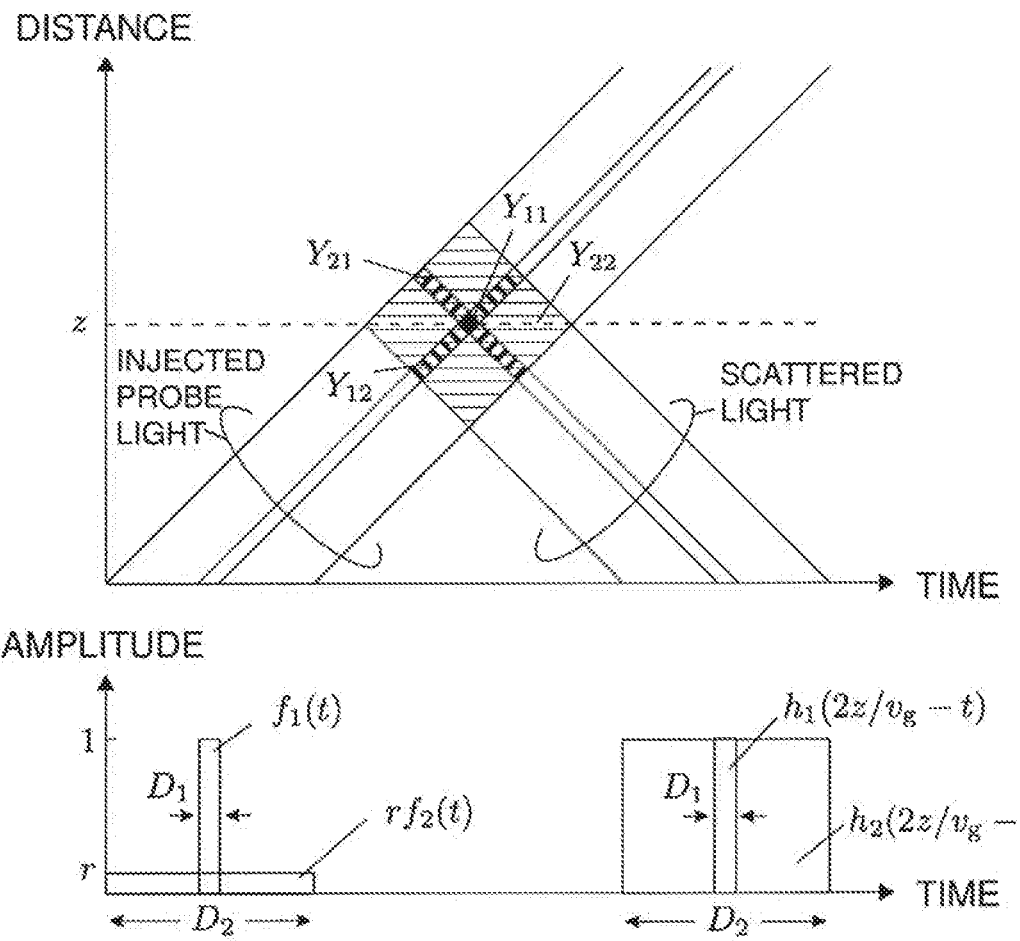
FIG. 3 is a diagram for explaining a relationship between the injected probe light and a scattered light in the S-BOTDR according to Embodiment 1.

Next, an actual S-BOTDR measurement system is described. FIG. 2 is an exemplary block diagram showing the S-BOTDR measurement system, and FIG. 3 shows diagrams illustrating a two-dimensional time-and-space relationship between the injected probe light and a scattered light therefrom to explain a signal processing for the S-BOTDR using measurement system shown in the block diagram.

Referring to FIG. 2, the measurement system for S-BOTDR has a probe light generator 8 for generating a probe light, in which a short pulse generator 2 and a long pulse generator 3 in a pulse generator 4 form, from a laser light from a laser light source 1, two kinds of light pulses: a short pulse and a long pulse having predetermined durations $D_1$, $D_2$, respectively; the long pulse is phase-modulated by a phase shifter 5 in accordance with phases selected by a phase selector 6, whereby phase information based on two Golay code sequences is imparted to the long pulse; a pulse combiner 7 combines the phase-modulated long pulse and the previously-described short pulse as a pair to be located at respective predetermined time positions; and then the pulse pair is injected as the probe light into one end of an optical fiber provided for measuring physical quantities of a measurement object. The probe light $f^{(j)}(t)$ launched from the probe light generator 8 is injected into the optical fiber via an optical coupler 9. Then, Brillouin backscattering occurs in the optical fiber by the probe light injected thereinto. The generated Brillouin backscattered light is received via the optical couple 9 by an optical heterodyne receiver 10 along with the reference laser light directly entered thereinto from the laser light source 1. The signal optically heterodyne-received by the optical heterodyne receiver 10 is further heterodyne-received (downshifted) with a specific frequency signal from a local oscillator 11 by a heterodyne receiver 12. The heterodyne-received signal is converted into digital data by an A-D converter 13 and then input to a signal processor 14, in which the digital data is passed through matched filters corresponding to the respective optical pulses, to calculate a cross-spectrum from the filtered data. Thus, the probe light generator 8 is configured with the pulse generator 4 made up of the short pulse generator 2 and the long pulse generator 3; the phase shifter 5 for imparting the phase information $\lambda_j$ output from the phase selector 6 to the long pulse generated by the long pulse generator 3; and the pulse combiner 7 for combining the short pulse and the long pulse.

The signal processing in the measurement system shown in the block diagram of FIG. 2 uses two kinds of low-pass filters respectively corresponding to matched filters for the short pulse and the long pulse of the probe light. These are specifically expressed by the following Eqs. (9), (10):

$$h_1(t) = f_1(-t) \qquad (9)$$

$$h_2(t) = f_2(-t) \qquad (10).$$

The outputs from these low-pass filters are expressed by Eqs. (11), (12), respectively:

$$Y_1^{(j)} = Y_{11} + r\lambda_j Y_{21} \qquad (11)$$

$$Y_2^{(j)} = Y_{12} + r\lambda_j Y_{22} \qquad (12).$$

The meanings of each term in the right hand side of these Equations are as follows:

$Y_{11}$: the short impulse-response output of the short pulse $f_1(t)$ by $h_1(t)$;

$Y_{12}$: the long impulse-response output of the short pulse $f_1(t)$ by $h_2(t)$;

$Y_{21}$: short impulse-response output of the long pulse $f_2(t)$ by $h_1(t)$; and $Y_{22}$: the long impulse-response output of the short pulse $f_2(t)$ by $h_2(t)$.

These correspond to integrals of phonon over the respective pattern-distinguished rhombus regions in the rectangular region where the injected probe light is scattered, as shown in FIG. 3. To be more specific, $Y_{11}$ is the output from the center region indicated by black; $Y_{12}$ is the output from the lower-left and upper-right strip region including the center region, indicated by the stripe pattern around the center region; $Y_{21}$ is the output from the lower-right and upper-left strip region including the center region, indicated by the stripe pattern around the center of $Y_{11}$; and $Y_{22}$ is the output from the whole rhombus region: the center region, the lower-left and upper-right strip region including the center region, and the lower-right and upper-left strip region including the center region.

With $Y_1^{(j)}$, $Y_2^{(j)}$ and $Y_{11}$, $Y_{12}$, $Y_{21}$, $Y_{22}$ defined above, a cross-spectrum for the probe light $f^{(j)}(t)$ is expressed by the following Eq. (13)

$$\begin{aligned} V^{(j)} &= Y_1^{(j)} \overline{Y_2^{(j)}} \\ &= (Y_{11} + r\lambda_j Y_{21})(\overline{Y_{12}} + r\overline{\lambda_j} \overline{Y_{22}}) \\ &= Y_{11}\overline{Y_{12}} + r\overline{\lambda_j} Y_{11}\overline{Y_{22}} + r\lambda_j Y_{21}\overline{Y_{12}} + r^2 Y_{21}\overline{Y_{22}}. \end{aligned} \qquad (13)$$

where the overbar ( ¯ ) denotes complex conjugate. Among the right hand side of Eq. (13), a desired component $D_p$ for obtaining high resolutions both in space and frequency is only term expressed by Eq. (14):

$$D_p = Y_{11}\overline{Y_{22}} \qquad (14).$$

and the real part thereof gives an ideal spectrum with high resolution both in space and time. Hence, using the cross-spectrum expressed by Eq. (13) for each probe light, a synthetic spectrum is defined as the following Eq. (15):

$$V_S(t, v) = \hat{R}\left(\sum_{j=1}^{p} c_j V^{(j)}(t, v)\right), \qquad (15)$$

where the symbol $\hat{R}(\ )$ denotes an operator of taking the real part of the operand in the parentheses (the same applies below).

Substituting Eq. (13) into Eq. (15) shows that to leave the desired terms in the synthetic spectrum is equivalent to obtain $c_j$ (j=1, 2, . . . , p) that satisfy the following Eq. (16):

$$\begin{pmatrix} 1 & 1 & \cdots & 1 \\ \lambda_1 & \lambda_2 & \cdots & \lambda_p \\ \overline{\lambda_1} & \overline{\lambda_2} & \cdots & \overline{\lambda_p} \end{pmatrix} \begin{pmatrix} c_1 \\ c_2 \\ \vdots \\ c_p \end{pmatrix} = \begin{pmatrix} 0 \\ 0 \\ p \end{pmatrix}. \qquad (16)$$

Since the number of equations (16) is at least three, the number p of variables needs to be three or more. Although the solutions of the equation (16) are not unique for p≥4, it is found by considering Eqs. (6) to (8) that the solutions for any values of p≥3 are given by the following Eq. (17):

$$c_j = \lambda_j, j = 1, 2, \ldots, p \qquad (17).$$

Hereinafter, using the solutions expressed by Eq. (17), the synthetic spectrum is evaluated by the following Eq. (18):

$$V_S(t, v) = \hat{R}\left(\sum_{j=1}^{p} \lambda_j V^{(j)}(t, v)\right). \qquad (18)$$

<Measurement Procedure for S-BOTDR Using Cross-Spectrum>

The measurement for the S-BOTDR using the cross-spectrum described above is implemented in accordance with the following procedure of the steps (a) to (e). It is noted that the steps (a) to (d) are carried out for j=1, 2, ..., p, and for ν=ν$_1$, ν$_2$, ..., ν$_k$, where k is the number of extracted frequency components.

(a) forming the probe light having the shape of $f^{(j)}(t)$ from the laser light from the laser light source and injecting the probe light into the optical fiber;

(b) optically heterodyne-receiving the Brillouin scattered light with the reference light from the laser light source, and further downshifting with the high frequency signal from the local oscillator by the heterodyne receiver, to output a signal $X^{(j)}(t)$;

(c) passing the signal $X^{(j)}(t)$ through the two low-pass filters $h_1(t)$, $h_2(t)$ corresponding to the short pulse and the long pulse, to extract frequency components $Y_1^{(j)}(t, \nu)$, $Y_2^{(j)}(t, \nu)$ having frequency ν, respectively;

(d) calculating the cross-spectrum $V^{(j)}(t, \nu)$ of each frequency component using the following Eq. (19):

$$V^{(j)}(t,\nu) = Y_1^{(j)}(t,\nu)\overline{Y_2^{(j)}(t,\nu)} \tag{19}$$

and (e) calculating the S-BOTDR spectrum $V_s(t, \nu)$ using the following Eq. (20):

$$V_S(t, \nu) = \hat{R}\left(\sum_{j=1}^{p} \lambda_j V^{(j)}(t, \nu)\right). \tag{20}$$

The above-mentioned procedure is repeated many times, to accumulate and average these calculated spectra.

While the S-BOTDR is implementable by at least three kinds of probe lights as described above, the case of using the four kinds of probe lights is described here for simplicity of notation. In this case, the four points arranged at equal interval are expressed by Eq. (21):

$$\lambda_1=1, \lambda_2=i, \lambda_3=-1, \lambda_4=-i \tag{21}.$$

Signal Processing of S-BOTDR

Next, a signal processing for S-BOTDR is described in detail below. In the signal processing, each frequency component is extracted, with the frequency being fixed, from data obtained by the broadband reception (for example 5 GHz) and a fast sampling (for example, sampling cycle of 0.2 ns).

Figure 4:
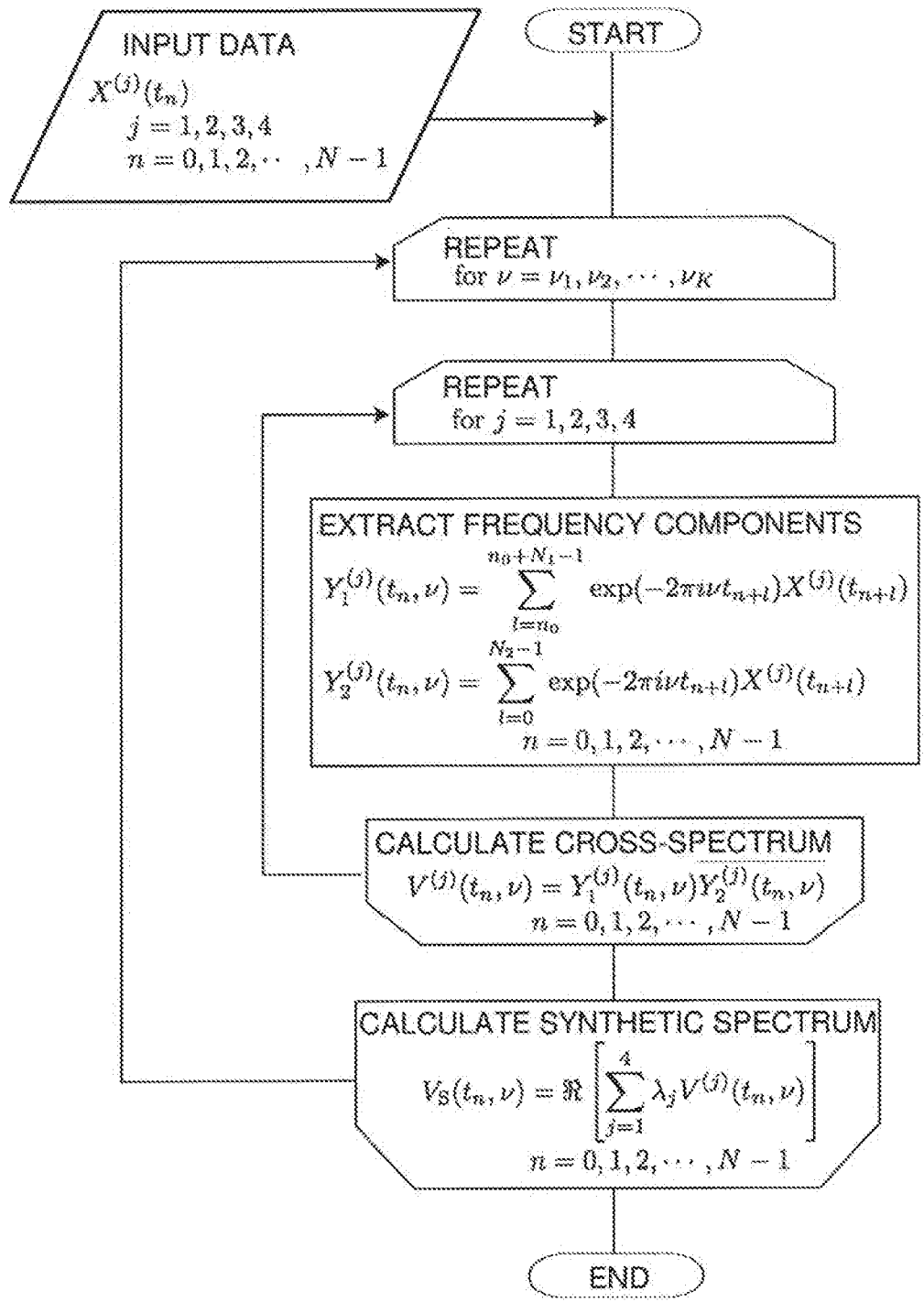
FIG. 4 is a flowchart of signal processing in the S-BOTDR according to Embodiment 1.

The returned scattered light generated by each injected probe light is heterodyne-received and then A-D converted and sampled into data $X^{(j)}(t_n)$ (j=1, 2, 3, 4), where j indicates the kind of probe light, $t_n=n\Delta t$(n=0, 1, 2, ..., N-1) is a discrete time, and $\Delta t$ is a sampling interval. The data output from both I, Q channels are complex data having a real part and an imaginary part. A flowchart of the signal processing in the S-BOTDR is shown in FIG. 4. The individual steps in the flowchart are described in further detail below.

<Extraction of Frequency Components>

The frequencies of extracted frequency components are expressed as ν=ν$_1$, ν$_2$, ..., ν$_K$, where K is the number of extracted frequency components. Each frequency component is extracted from the downshifted signal by the two kinds of low-pass filters. The two kinds of low-pass filters take moving sums over the durations of the short and long pulses, respectively. The numbers of sampling points over the respective durations are expressed as the following Eq. (22):

$$N_1 = \frac{D_1}{\Delta t}, N_2 = \frac{D_2}{\Delta t}. \tag{22}$$

Further, an index $n_0$ corresponding to the start time to previously shown by Eq. (3) is defined as Eq. (23):

$$n_0 = \frac{t_0}{\Delta t}. \tag{23}$$

With the above definitions, frequency components of the probe lights $f^{(j)}(t)$ output from the low-pass filters are expressed for a frequency ν by Eqs. (24), (25):

$$Y_1^{(j)}(t_n, \nu) = \sum_{l=n_0}^{n_0+N_1-1} e^{-2\pi i \nu t_{n+1}} X^{(j)}(t_{n+l}) \tag{24}$$

$$Y_2^{(j)}(t_n, \nu) = \sum_{l=0}^{N_2-1} e^{-2\pi i \nu t_{n+1}} X^{(j)}(t_{n+l}). \tag{25}$$

<Utilization of FFT>

While the above explains in the method of processing the frequency components in the time domain, the processing can also be achieved by utilizing an FFT. A method utilizing an FFT is described below. A length of the FFT $N_{fft}$ is determined by Eq. (26):

$$N_{fft} = \frac{1}{\Delta t \Delta \nu}, \tag{26}$$

where $\Delta t$ is the sampling interval and $\Delta \nu$ is a frequency step size for obtaining a desired frequency resolution. With this definition, the frequency components extracted by the FFT is expressed by Eqs. (27), (28):

$$Y_1^{(j)}(t_n,\bullet) = \text{fft}(\text{zeros}(n_0-1), X^{(j)}(t_{n+n_0}), \ldots,$$
$$X^{(j)}(t_{n+n_0+N_1-1}), N_{fft}) \tag{27}$$

$$Y_2^{(j)}(t_n,\bullet) = \text{fft}(X^{(j)}(t_n), \ldots, X^{(j)}(t_{n+N_2-1}), N_{fft}) \tag{28},$$

where the last argument of the function fft represents the length, and zeros($n_0$-1) denotes that ($n_0$-1) counts of zeros are arranged to satisfy the number of arguments with the specified length when the number of data is smaller than the length.

The frequency components $Y_1^{(j)}(t_n, \bullet)$, $Y_2, k^{(j)}(t_n, \bullet)$ thus calculated have dimensions $N_{fft}$ in the frequency direction, where the symbol "•" denotes the direction of argument. Since the dimensions $N_{fft}$ are generally larger than the number K of frequency components desired to extract, the size of dimension is limited to K to use the frequency components extracted using the fft in the post processing.

<Cross-Spectrum>

A cross-spectrum $V^{(j)}(t, \nu)$ for the probe light $f^{(j)}(t)$ is calculated from the outputs of the two kinds of low-pass filters using Eq. (29):

$$V^{(j)}(t_n,\nu) = Y_1^{(j)}(t_n,\nu)\overline{Y_2^{(j)}(t_n,\nu)} \tag{29}.$$

<Synthesis of Spectrum>

The synthetic spectrum $V_s(t_n, \nu)$ is calculated using the cross-spectrum of the filtered outputs obtained each probe light by Eq. (30):

$$V_S(t_n, \nu) = \hat{R}\left[\sum_{j=1}^{4} \lambda_j V^{(j)}(t_n, \nu)\right]. \tag{30}$$

Accumulation by Repetition of Measurement

While the above-mentioned synthetic Brillouin spectrum is obtained in a single measurement, it is generally known that the spectrum obtained by each measurement has large fluctuations and its distribution follows the Rayleigh distribution (see Non-Patent Document 4). Accordingly, the spectrum needs to be accumulated by repeating the measurement multiple times (about $2^{10}$ to $2^{14}$ times) to obtain accurate data. Letting the spectrum obtained in the $i_{rep}$-th measurement be $V_s(i_{rep})$ and the repetition count be $n_{rep}$, the accumulated spectrum $V_{s, accum}$ is expressed by the following Eq. (31):

$$V_{S,accum} = \sum_{i_{rep}=1}^{n_{rep}} V_S(i_{rep}). \tag{31}$$

Treatment of Polarization

Light polarization varies in the optical fiber, so that difference in polarization generated between the scattered light and the reference light. In order to remove the influence of the polarization, the signal is split into two polarization components and each component is accumulated as described above, to take the sum of the split spectra. The polarization-treated spectrum $v_{s, accum}^{Pol}$ obtained for the two polarization components $V_{s, accum}^{(P)}$ and $V_{s, accum}^{(s)}$ are expressed by Eq. (32):

$$V_{s,accum}^{Pol} = V_{S,accum}^{(P)} + V_{S,accum}^{(S)} \tag{32},$$

where the superscript (P) and (S) denote p-polarization and s-polarization, respectively. Note that since the accumulation of the spectra obtained by repeating the measurements and the polarization processing both are simple summation operations, either may be carried out first.

Non-Linear Optical-Effect Reduction Method (1)

In the S-BOTDR, several kinds of composite pulses formed by combining the short pulse and the long pulse are used as probe lights. It is found that in cases of stepwise change of amplitude of the composite pulse or of amplitudes of several kinds of probe lights being different from each other, influence of a non-linear optical effect becomes appreciable when the power of the probe lights is increased. Large power of the probe lights causes a phase shift due to non-linear optical effect (hereinafter, also referred to as "Kerr effect"). Moreover, When the probe lights are the composite pulse formed by combining the short pulse and the long pulse and their amplitudes are different from each other, a phase difference occurs between the short and long pulses. Hence, the phase shift and the phase difference are examined and a method of reducing them is described below.

<Phase Shift in S-BOTDR>

A method of approximating the phase shift is described first. Since the amplitudes of the short and long pulses combined are largely different from each other, the amplitude and phase of the probe light vary with distance z owing to transmission loss and the non-linear optical effect (Kerr effect) as expressed by Eq. (33):

$$f^{(j)}(t) = e^{-\alpha z}(g_1 \cdot f_1(t) + r \cdot g_2 \cdot f_2(t)) \tag{33},$$

where $g_1$, $g_2$ each are exponential functions as expressed by Eq. (34):

$$g_1 = \exp(i\gamma p_1^{(j)} z_{eff}),\ g_2 = \exp(i\gamma p_2 z_{eff} + i\theta_j) \tag{34},$$

where $\theta_j$ represents the phase difference between the short pulse and the long pulse, and have variables including effective distance $z_{eff}$ expressed by Eq. (35):

$$z_{eff} = \frac{1 - \exp(-\alpha z)}{\alpha}. \tag{35}$$

In Eqs. (33) to (35), $\alpha$ is a loss coefficient of the optical fiber; $\gamma = n_2 k_0 / A_{eff}$ is the coefficient of Kerr effect; $n_2$ is a non-linear refractive index of the optical fiber; $k_0 = 2\pi/\lambda$ is a wavenumber of light in vacuum; $\lambda$ is a wavelength of light in vacuum; $A_{eff}$ is an effective cross section of the optical fiber core; and $p_1^{(j)}$ and $p_2$ are respective powers of the composite pulse and the long pulse; and $r$ is an amplitude ratio of the long pulse to that of the short pulse, which ratio is typically set to one or smaller to reduce fluctuations of the spectrum.

The power $p_1^{(j)}$ varies depending on the phase because the phase difference between the short pulse and the long pulse varied with the distance owing to the non-linear optical effect. The long pulse power $p_2$, on the other hand, is constant. These powers are expressed by Eq. (36):

$$p_1^{(j)} = |1 + re^{i\theta_j}|^2 P_P,\ p_2 = r^2 P_P \tag{36},$$

where $P_P$ is the power of probe light.

Next, a method of precisely estimating phase shift is described. Since the short pulse and the long pulse of the probe lights for the S-BOTDR are overlapped with phase difference, the power variation and the phase shift variation due to the non-linear optical effect is sophisticated. While the power of the overlapped pulse is approximated by Eq. (36) in the above approximate evaluation, the power is more precisely evaluated as below.

Variation of the probe lights due to the non-linear optical effect is expressed as Eq. (37):

$$f^{(j)}(t) = e^{-\alpha z}(g_3 \cdot f_1(t) + r \cdot g_4 \cdot f_2(t)) \tag{37},$$

where $g_3$, $g_4$ are expressed by the following Eq. (38):

$$g_3 = \exp(i\theta_{n1,1}^{(j)}),\ g_4 = \exp(i\theta_{n1,2} + i\theta_j) \tag{38},$$

Note that the variables in $g_3$, $g_4$ include the phase shifts $\theta_{n1,1}^{(j)}$ and $\theta_{n1,2}$ due to the Kerr effect.

Considering transmission loss and non-linear optical effect, the powers of the short and long pulses are expressed by the following Eqs. (39), (40), respectively:

$$p_1^{(j)} = e^{-\alpha z} |\exp(i\theta_{n1,1}^{(j)}) + r \exp(i\theta_{n1,2} + i\theta_j)|^2 P_P \tag{39}$$

$$p_2 = e^{-\alpha z} r^2 P_P \tag{40},$$

Hence, phase shift difference $\theta_{n1}^{(j)} = \theta_{n1,1}^{(j)} - \theta_{n1,2}$ follows the following differential equation. (41):

$$\frac{d\theta_{n1}^{(j)}}{dz} = \gamma e^{-\alpha z} \left[1 + 2r \cos\left(\theta_{n1}^{(j)} - \theta_j\right)\right] P_P. \tag{41}$$

Examining the phase shifts calculated from this equation shows that although an average phase-shift characteristic variation with distance for the four probe lights is the same as that calculated using the approximate equation, individual phase-shifts for the four probe lights are significantly different from those calculated using the approximate equation. Note that since details of the phase shift does not directly relate to the content of the present application, their description is omitted here.

When the non-linear optical effect is appreciable, some components do not become completely zero in synthetic spectra obtained by the measurements using the four kinds of probe lights because the phase difference $\theta_{n1}^{(j)}$ varies depending on j. On the contrary, even if the phase difference $\theta_{n1}^{(j)}$ little depends on j, desired components cannot be surely extracted in synthesizing the spectrum because an average phase shift $\theta_{n1}$ is expressed by Eq. (42):

$$4\hat{R}[e^{i\theta_{n1}}]\langle Y_{11}\overline{Y_{22}} \rangle \quad (42),$$

where the operator "$\langle \ \rangle$" at the last in the right side of the equation denotes an average of the multiple measurements. Thus, it is necessary to reduce the non-linear optical effect. A method therefor is hence examined below.

<Typical Example of Non-Linear Optical-Effect Reduction Method>

In order to reduce the non-linear optical effect in the S-BOTDR, there is a method in which four kinds of composite filters shown below by Eq. (43):

$$h^{(j)}(t)=h_1(t)+re^{i\phi j}h_2(t), j=1,2,3,4 \quad (43)$$

are replaced, using estimated phase shifts, with the following Eq. (44):

$$h^{(j)}(t)=\exp(-i\hat{\theta}_{n1,1}^{(j)})h_1(t)+\exp(-i\hat{\theta}_{n1,2})re^{i\phi j}h_2(t) \quad (44).$$

The two estimated phase shifts $\hat{\theta}_{n1,1}^{(j)}$, $\hat{\theta}_{n1,2}$ in the right side of Eq. (44) are given by approximate equations for phase shifts of the probe light shown by the following Eqs. (45), (46), respectively:

$$\hat{\theta}_{n1,1}^{(j)}=\gamma p_1^{(j)} z_{\mathit{eff}} \quad (45)$$

$$\hat{\theta}_{n1,2}=\gamma p_2 z_{\mathit{eff}} \quad (46),$$

where $p_1^{(j)}$ and $p_2$ in the approximate equations are given by the previously shown Eq. (36).

<Non-Linear Optical-Effect Reduction Method (1)>

Firstly, a description is made below as to a non-linear optical-effect reduction method (1) using the phase correction method described in the above subhead "Typical Example". Since in the S-BOTDR using the cross-spectrum, the equation for calculating the cross-spectrum of the filtered outputs obtained from each probe light is in the form of the following Eq. (47) as previously shown by Eq. (29), the phase correction may be made to Eq. (47) using Eq. (48) below:

$$V^{(j)}(t_n,\nu)=Y_1^{(j)}(t_n,\nu)\overline{Y_2^{(j)}(t_n,\nu)} \quad (47)$$

$$\theta_{nl}(t_n)=\gamma P_P z_{\mathit{eff}}(t_n) \quad (48),$$

where $\gamma$ is the coefficient of Kerr effect, and $P_P$ is the probe light power, and $z_{\mathit{eff}}(t_n)$ is expressed by the following Eq. (49):

$$z_{\mathit{eff}}(t_n) = \frac{1-\exp(-\alpha z_n)}{\alpha}, \quad (49)$$

where $z_n=v_g t_n/2$ is a distance for $t_n$, and $v_g$ is a light velocity in the optical fiber.

In order to correct the phase in this way, the previously-shown equation (30) for calculating the synthetic spectrum may be modified to the following Eq. (50):

$$V_S(t_n, \nu) = \hat{R}\left[\exp(-i\theta_{nl}(t_n))\sum_{j=1}^{4}\lambda_j V^{(j)}(t_n, \nu)\right]. \quad (50)$$

Figure 5:
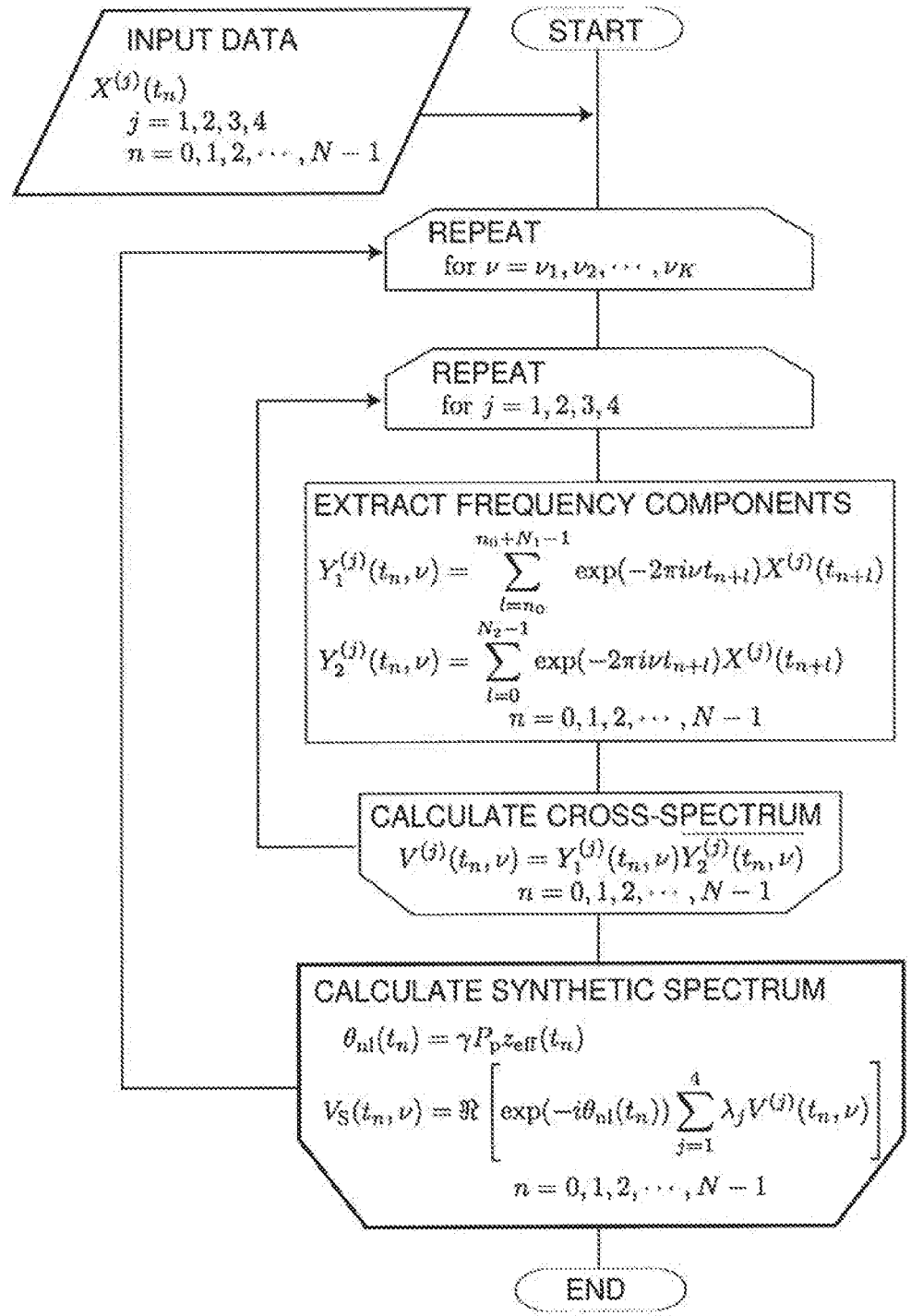
FIG. 5 is a flowchart showing an example of a non-linear optical effect reducing method for the S-BOTDR according to Embodiment 1.

A flowchart of this method is shown in FIG. 5. In the flowchart, the algorithm shown as "calculate synthetic spectrum" in the last inverted-trapezoid block is different from that shown in FIG. 4.

The phase correction is made to the algorithm in the description of the subhead "<Non-Linear Optical-Effect Reduction Method (1)>" to reduce the non-linear optical effect. Since the correction equation involves the coefficient of Kerr effect $\gamma$, however, it is necessary to estimate accurately the value of $\gamma$. However, since $\gamma$ depends on optical fibers, its accurate value needs to be estimated from data. Moreover, although such phase correction can restore desired terms in the process of synthesizing the spectrum, a cancelling effect of an unnecessary terms decrease. Hence, another method without phase correction is described below.

<Non-Linear Optical-Effect Reduction Method (2)>

Here, a description is made below of a method of evaluating the synthetic spectrum not by taking the real part thereof but by taking the absolute value thereof without correcting the phase. In the S-BOTDR using the cross-spectrum, if there appears no non-linear optical effect, the synthetic spectrum is calculated by taking the real part of the cross-spectrum as shown by the above equation (30). When the non-linear optical effect becomes appreciable, however, a different phase change is added depending on the distance. Taking the absolute value instead of the real part eliminates influence of the phase change. Thus, the spectrum may be synthesized with it remaining intact in the complex form as expressed by the following Eq. (51):

$$V_S(t_n, \nu) = \sum_{j=1}^{4}\lambda_j V^{(j)}(t_n, \nu). \quad (51)$$

Specifically, after the accumulation of the spectra obtained by repeating the measurement using Eq. (51) and the polarization processing (see the above equation (32)), the synthetic spectrum may be calculated finally by taking the absolute value of the accumulated and polarization-treated the synthetic spectra using the following Eq. (52):

$$V_{S,\mathit{final}}=|V_{S,\mathit{accum}}^{Pol}| \quad (52).$$

Figure 6:
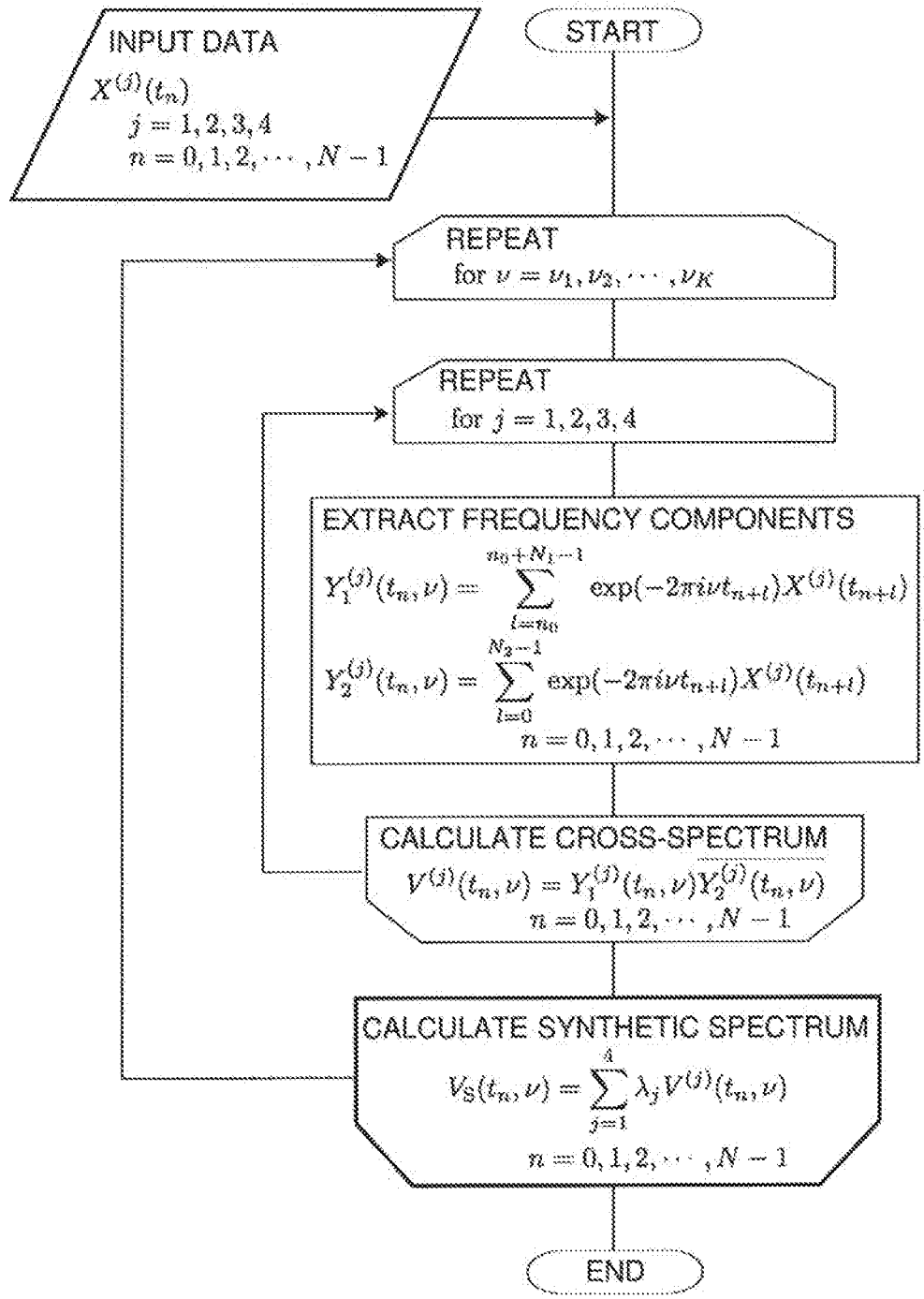
FIG. 6 is a flowchart showing another example of the non-linear optical effect reducing method for the S-BOTDR according to Embodiment 1.

A flowchart of this procedure is shown in FIG. 6. In the flowchart, the algorithm shown as "calculate synthetic spectrum" in the last block is different from those shown in FIGS. 4 and 5.

Technique of Coded S-BOTDR

<Golay Code Sequence>

When the summation of respective autocorrelation of a pair of code sequences $A_k$, $B_k$ having a length M, where k=0, 1, ..., M−1, are all zero except for a nonzero shift, that is, Eq. (53) holds:

$$\sum_{m=0}^{M-1}(A_m A_{m+k} + B_m B_{m+k}) = 2M\delta_k, \quad (53)$$

the code sequences are called "complementary sequence", where $\delta_k$ in Eq. (53) is defined as the following Eq. (54):

$$\delta_k = \begin{cases} 1, & \text{if } k=0 \\ 0, & \text{otherwise} \end{cases}. \quad (54)$$

Generally, a Golay code sequence is composed of binary complementary code sequences having values of ±1, and when the length M is a power of 2, the binary complementary code sequences can be given by a method called an appending method represented by the following Eq. (55):

$$\begin{Bmatrix} A \\ B \end{Bmatrix} \to \begin{Bmatrix} A | & B \\ B | & -B \end{Bmatrix} \quad (55)$$

A specific example of Eq. (55) is shown by Eq. (56):

$$\begin{Bmatrix} 1 \\ 1 \end{Bmatrix} \to \begin{Bmatrix} 1, & 1 \\ 1, & -1 \end{Bmatrix} \to \quad (56)$$

$$\begin{Bmatrix} 1, & 1, & 1, & -1 \\ 1, & 1, & -1, & 1 \end{Bmatrix} \to \begin{Bmatrix} 1, & 1, & 1, & -1, & 1, & 1, & -1, & 1 \\ 1, & 1, & 1, & -1, & -1, & -1, & 1, & -1 \end{Bmatrix}.$$

Figure 7B:
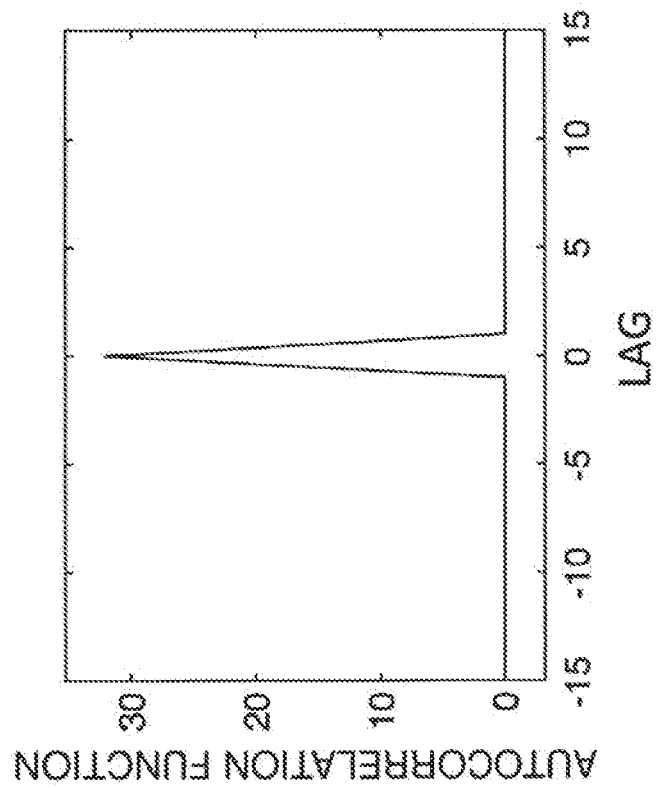
FIGS. 7A and 7B are diagrams for explaining an example of zero-sum Golay code sequences used in Embodiment 1.
Figure 7A:
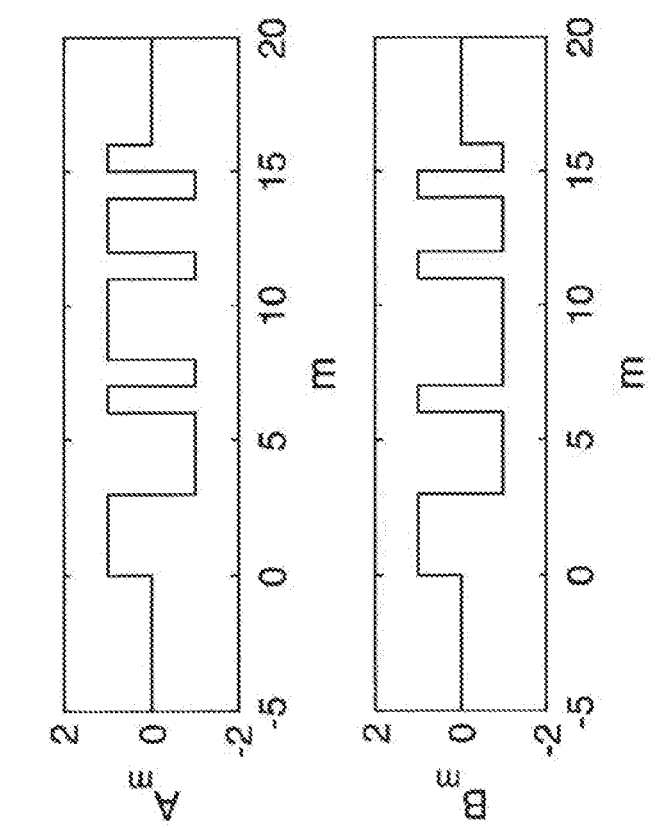

The coding is performed here using the Golay code sequence described above. An example of the Golay code sequence of M=16 is shown in FIG. 7.

<Formation of Probe Light>

As already described, the S-BOTDR uses the probe lights composed of the four kinds of composite pulses formed by combining the short pulse and the long pulse. Each kind of composite pulses is coded into composite pulse trains with the two Golay code sequences. Accordingly, the four kinds of composite pulse are coded into eight kinds and the composite pulse trains are coded to have eight sequences in total and probe light is also becomes eight kinds. For example, using a Golay code sequence of M=4, the probe light is coded into eight sequences as expressed by the following Eq. (57):

$$\begin{cases} \lambda_1, A: \{1 & 1 & 1 & -1\} \\ \lambda_1, B: \{-1 & -1 & 1 & -1\} \\ \lambda_2, A: \{i & i & i & -i\} \\ \lambda_2, B: \{-i & -i & i & -i\} \\ \lambda_3, A: \{-1 & -1 & -1 & 1\} \\ \lambda_3, B: \{1 & 1 & -1 & 1\} \\ \lambda_4, A: \{-i & -i & -i & i\} \\ \lambda_4, B: \{i & i & -i & i\} \end{cases}. \quad (57)$$

The phase modulation based on the coding is made to only either one of the short pulse or the long pulse. With the interval d of the composite pulse train and the number M of sequences, the eight kinds of probe lights are formed as expressed by the following Eqs. (58), (59):

$$f^{(A,j)}(t) = \sum_{m=0}^{M-1}[f_1(t-md) + \lambda_j A_m rf_2(t-md)], \, j=1,2,3,4 \quad (58)$$

$$f^{(B,j)}(t) = \sum_{m=0}^{M-1}[f_1(t-md) + \lambda_j B_m rf_2(t-md)], \, j=1,2,3,4, \quad (59)$$

where the superscript (A, j) and (B, j) correspond to code sequences ($\lambda_j$, A) and ($\lambda_j$, B), respectively.

While the long pulse is phase-modulated on the basis of the Golay code in the above, the short pulse may be phase-modulated with the long pulse remaining intact. In this case, the eight kinds of probe lights are formed as expressed by the following Eqs. (60), (61):

$$f^{(A,j)}(t) = \sum_{m=0}^{M-1}[\lambda_j A_m f_1(t-md) + rf_2(t-md)], \, j=1,2,3,4 \quad (60)$$

$$f^{(B,j)}(t) = \sum_{m=0}^{M-1}[\lambda_j B_m f_1(t-md) + rf_2(t-md)], \, j=1,2,3,4. \quad (61)$$

Figure 8:
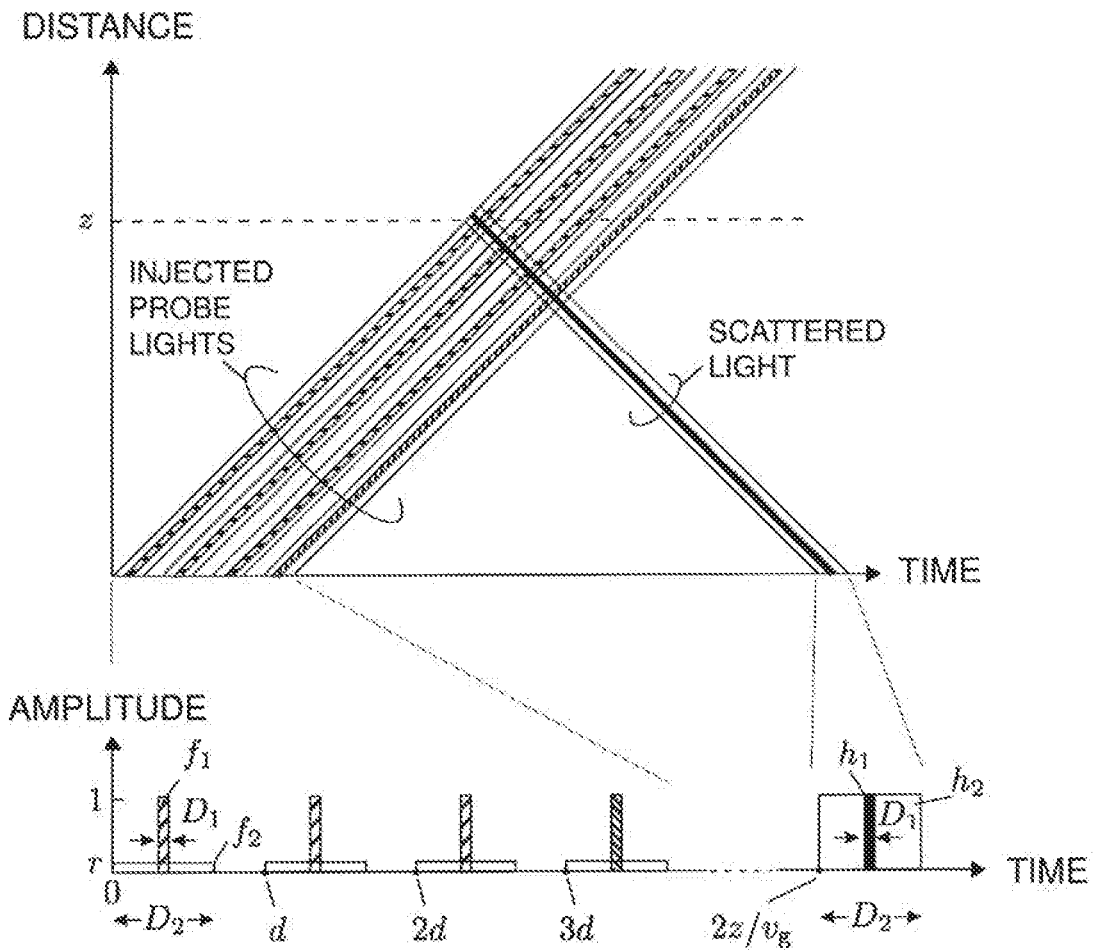
FIG. 8 is a diagram for explaining a relationship between injected probe lights and a scattered light in a coded S-BOTDR according to Embodiment 1.

FIG. 8 illustrates an example of a schematic diagram for explaining the relationship between the probe lights for the coded S-BOTDR and a scattered light therefrom in a case of the short pulse is phase-modulated with M=4. This example is a case of the sequence being (1, 1, 1, −1).

<Length and Interval of Pulse Train>

The length of the pulse train is first described below. Generally, when a pulse train is phase-modulated and then heterodyne-received, optical coherency needs to be established over the whole length of the pulse train. Put differently, phase fluctuation due to phase noise needs to be sufficiently small over the whole length of the pulse train. However, since the cross-spectrum is calculated from the outputs having common phase noise, of the previously-described two low-pass filters, the phase noise is cancelled out here.

For example, in a case of the composite pulse train A, outputs from the low-pass filter $h_1(t)$ are composed of M terms corresponding to the code sequence $\{A_m\}_{1 \le m \le M}$ and each term contains phase noise of the laser light. It is assumed that the phase noise does not change for a duration as long as that of the composite pulse. With the laser light phase noise $\varphi_N(t)$, an m-th term contains a phase term exp($-i\varphi_N(t-md)$) due to the phase noise. Since output from the other low-pass filter $h_2(t)$ contains the same phase term exp($-i\varphi_N(t-md)$) in the m-th term if the phase noise is common to both outputs, the corresponding phase terms has the same absolute value with opposite signs and cancelled out when complex conjugates are multiplied in calculating the cross-spectrum. This results in elimination of influence of the phase noise. In addition, terms not corresponding to each other have no correlation because of difference in time.

Thus, the light coherency of about the composite pulse duration eliminates influence of the phase noise, and eliminates restriction on the pulse train length. Accordingly, the code length M can be extended to any length.

Coherency of laser light is expressed by coherence time. The coherence time $\tau_{coh}$ of a laser light having a linewidth $\Delta f$ is expressed by Eq. (62):

$$\tau_{coh} = \frac{1}{\pi \Delta f}. \quad (62)$$

Since the duration of the composite pulse is equal to the long pulse duration $D_2$, the coherence time $\tau_{coh}$ is required to satisfy the inequality (63):

$$\tau_{coh} \gg D_2 \quad (63).$$

Note that this requirement is necessary for the S-BOTDR before coded. For example, when $\Delta f$=300 kHz, the coherent time is $\tau_{coh}$=1.06 μs. Accordingly, $D_2$=50 ns satisfies the requirement sufficiently.

<Interval Between Composite Pulses>

Figure 9:
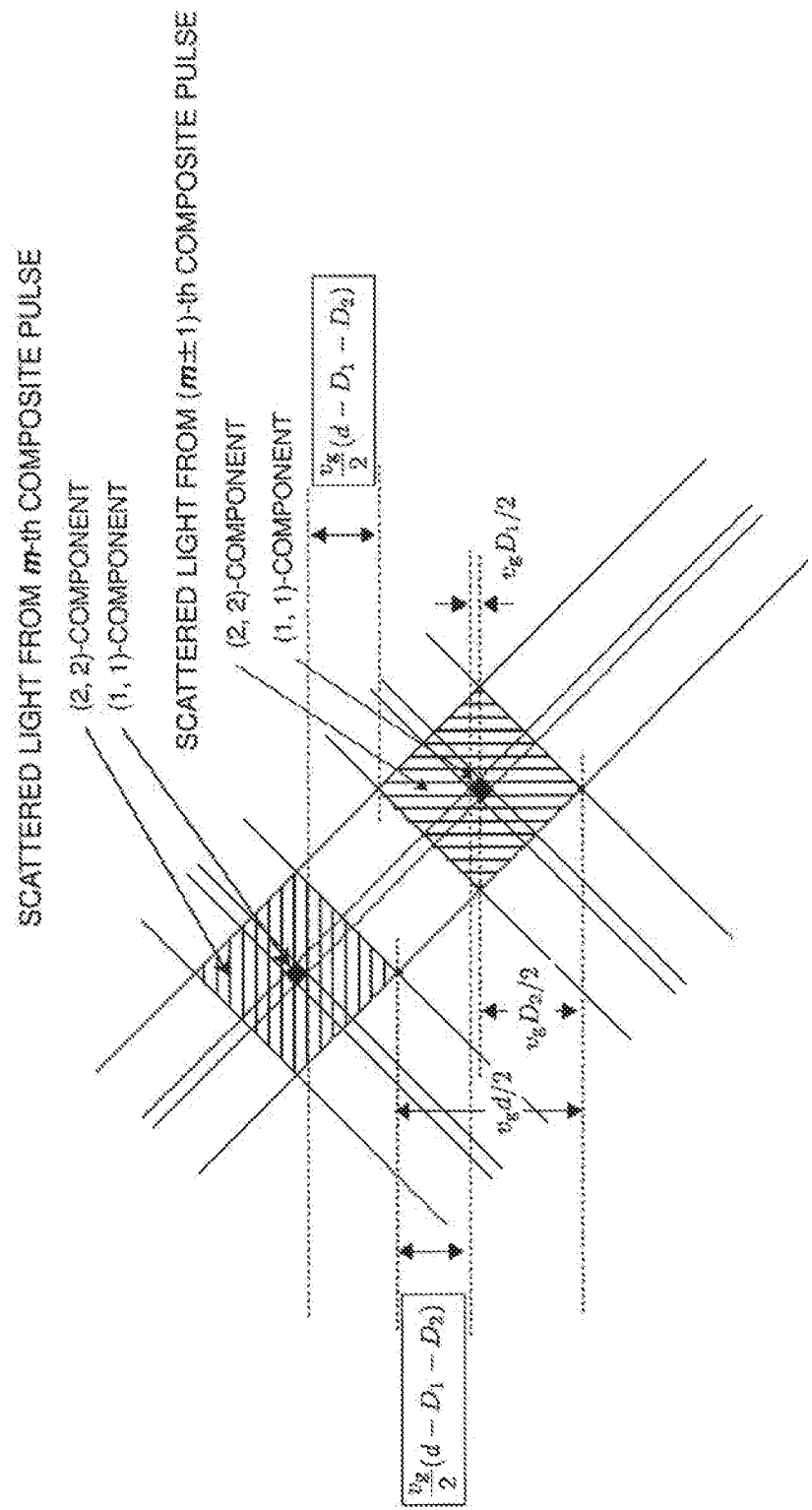
FIG. 9 is a diagram for explaining the lengths of and the interval between injected composite pulses in a scattered light in the coded S-BOTDR according to Embodiment 1.

The signals passed through the two low-pass filters include the scattered lights from all composite pulses in the pulse train. Decoding by means of correlation needs the scattered lights from adjacent composite pulses to have no correlation with each other. Since the cross-spectrum is calculated here from the outputs of the two low-pass filters, the data of the scattered light from the m-th composite pulse after passed through one of the low-pass filters and the data of the scattered light from the (m±1)-th composite pulse after passed through the other low-pass filter need to be separated from each other in the z-direction. However, separating the scattered light into the four outputs $Y_{11}$, $Y_{12}$, $Y_{21}$, $Y_{22}$ (see FIG. 3), the outputs except for the correlation of outputs $Y_{11}$, $Y_{22}$ are all cancelled out at the stage of synthesizing the spectrum. This eliminates the need to take into account the separation of the outputs. Thus, the decoding requires that the combination of the output $Y_{11}$ of the scattered light from the m-th composite pulse and the output $Y_{22}$ of the scattered light from the (m±1)-th composite pulse or the reverse combination are separated from each other in the z-direction. Since this requirement is expressed, as shown in FIG. 9, by the following inequality (64) with the composite pulse interval d:

$$\frac{v_g}{2}(d - D_1 - D_2) \geq 0, \quad (64)$$

the requirement for the interval d to satisfy is given by the inequality (65):

$$d \geq D_1 + D_2 \quad (65).$$

For example, d need to be 52 ns or longer for $D_1$=2 ns and $D_2$=50 ns.

Signal Processing in Coded S-BOTDR

Figure 10:
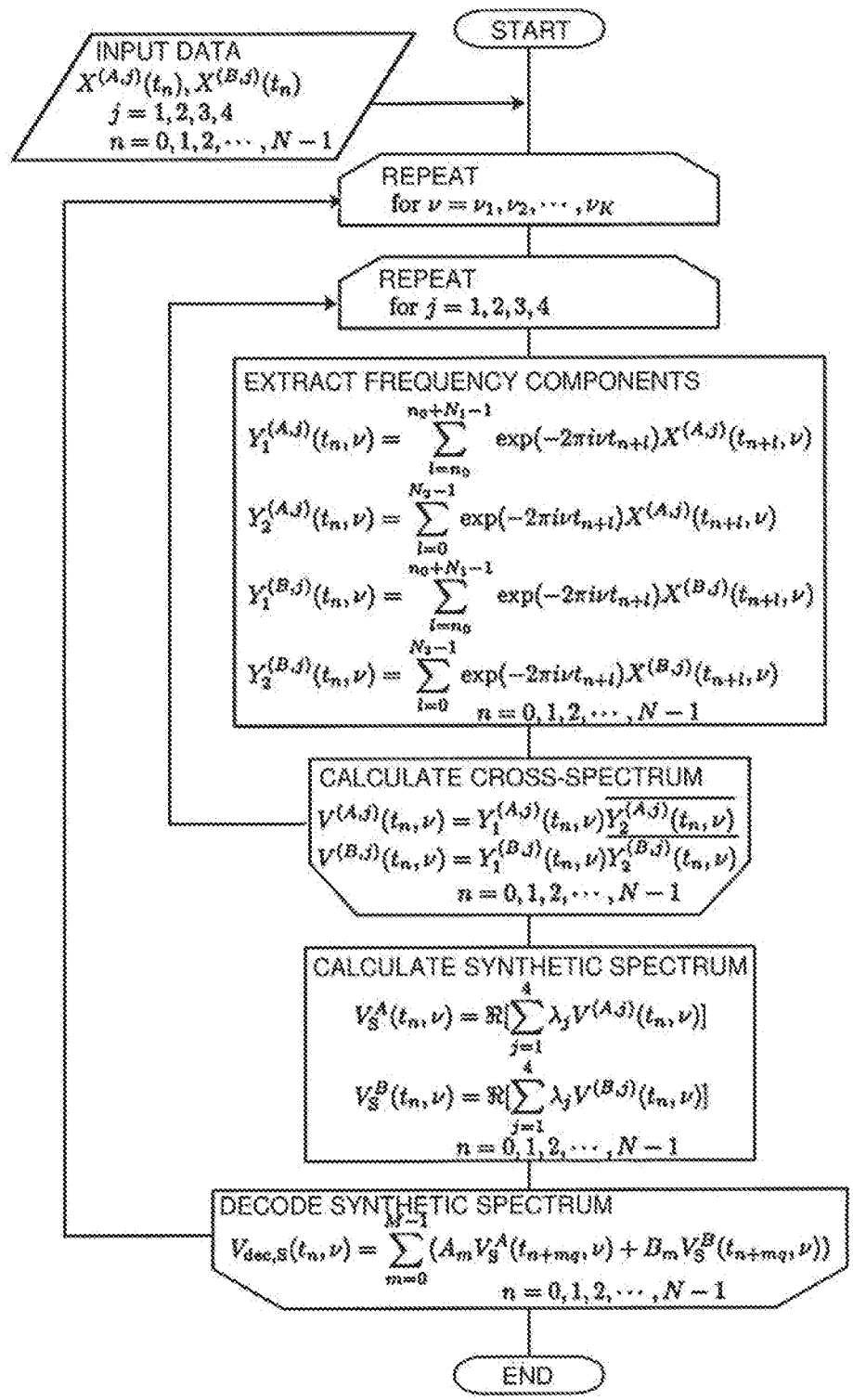
FIG. 10 is a flowchart of signal processing in the coded S-BOTDR according to Embodiment 1.

A description is made of a method of extracting, with the frequency being also fixed here, each frequency component from data obtained by the broadband reception and the fast sampling. Data of a returned scattered light generated by the probe light phase-modulated as Eq. (66) below is expressed as the following Eq. (67), which is heterodyne-received and then A-D converted and sampled, $$f^{(A,j)}(t), f^{(B,j)}(t), j=1,2,3,4 \quad (66)$$

$$X^{(A,j)}(t_n), X^{(B,j)}(t_n), j=1,2,3,4 \quad (67),$$

where $t_n = n\Delta t$ (n=0, 1, 2, ..., N) is the discrete time, and $\Delta t$ is the sampling interval. A flowchart of signal processing in the coded S-BOTDR is shown in FIG. 10.

<Extraction of Frequency Components>

The frequencies of the frequency components to be extracted are expressed as $v = v_1, v_2, \ldots, v_K$, where K is the number of frequency components. Each frequency component is extracted using the two kinds of low-pass filters, as with the S-BOTDR. The extracted frequency components are expressed for the sequence (A, j) (j=1, 2, 3, 4) as the following Eqs. (68), (69):

$$Y_1^{(A,j)}(t_n, v) = \sum_{l=n_0}^{n_0+N_1-1} e^{-2\pi i v t_{n+l}} X^{(A,j)}(t_{n+l}) \quad (68)$$

$$Y_2^{(A,j)}(t_n, v) = \sum_{l=0}^{N_2-1} e^{-2\pi i v t_{n+l}} X^{(A,j)}(t_{n+l}). \quad (69)$$

They are also expressed for the sequence (B, j) (j=1, 2, 3, 4) as the following Eqs. (70), (71):

$$Y_1^{(B,j)}(t_n, v) = \sum_{l=n_0}^{n_0+N_1-1} e^{-2\pi i v t_{n+l}} X^{(B,j)}(t_{n+l}) \quad (70)$$

$$Y_2^{(B,j)}(t_n, v) = \sum_{l=0}^{N_2-1} e^{-2\pi i v t_{n+l}} X^{(B,j)}(t_{n+l}). \quad (71)$$

<Utilization of FFT>

FFT can also be used for extracting the frequency components as with the case of the S-BOTDR. The frequency components are extracted by the FFT using the previously-described Eqs. (27), (28). In these equations, the superscript (j) expresses either (A, j) or (B, j). The detailed description of the other arguments and the like is omitted here because of the same as the previous description.

<Cross-Spectrum>

As with the S-BOTDR, the cross-spectrum for the sequence (A, j) (j=1, 2, 3, 4) is calculated from the outputs of the two kinds of low-pass filters using Eq. (72):

$$V^{(A,j)}(t_n,v) = Y_1^{(A,j)}(t_n,v) \overline{Y_2^{(A,j)}(t_n,v)} \quad (72).$$

The cross-spectrum for the sequence (B, j) (j=1, 2, 3, 4) is calculated similarly using the following Eq. (73):

$$V^{(B,j)}(t_n,v) = Y_1^{(B,j)}(t_n,v) \overline{Y_2^{(B,j)}(t_n,v)} \quad (73).$$

<Synthesis of Spectrum>

The synthetic spectra corresponding to the sequence A and sequence B of the Golay code are calculated using the following Eqs. (74), (75), respectively:

$$V_S^A(t_n, \nu) = \hat{R}\left[\sum_{j=1}^{4} \lambda_j V^{(A,j)}(t_n, \nu)\right] \quad (74)$$

$$V_S^B(t_n, \nu) = \hat{R}\left[\sum_{j=1}^{4} \lambda_j V^{(B,j)}(t_n, \nu)\right]. \quad (75)$$

<Decoding by Correlation>

The decoding is performed by taking the correlation as expressed by the following Eq. (76):

$$V_{dec,S}(t_n, \nu) = \sum_{m=0}^{M-1} (A_m V_S^A(t_{n+mq}, \nu) + B_m V_S^B(t_{n+mq}, \nu)), \quad (76)$$

where q (=d/Δt) is the number of discrete times (sampling points) in the interval d.

Accumulation by Repetition of Measurement

The Accumulation of the spectrum obtained by repeating measurement is the same as with the case of the S-BOTDR. Specifically, letting the measurement repetition count be $n_{rep}$, since the spectrum level becomes $n_{rep}$-fold and the standard deviation of the noise in the spectrum becomes $(n_{rep})^{0.5}$-fold, the SN ratio becomes $(n_{rep})^{0.5}$-fold of that obtained in a single measurement. While the fluctuations of the spectrum are caused by not only noise but also a fluctuation of the signal, a case of the noise being dominant is first considered here. A measurement repetition count $n_{rep}$ necessary for achieving a target accuracy is calculated by Eq. (77):

$$n_{rep} = \left(\frac{SNR_{rec}}{SNR_1}\right)^2, \quad (77)$$

where $SNR_{rec}$ is an SN ratio necessary for achieving the target accuracy and $SNR_1$ is an SN ratio per measurement in the S-BOTDR.

In the coded S-BOTDR, since coding with a code having a length M renders the level of the spectrum M-fold and the standard deviation of noise in the spectrum $M^{0.5}$-fold, the SN ratio becomes $M^{0.5}$-fold. That is, the coding with the code length M renders the SN ratio of the spectra equivalent to that of spectra accumulated by repeating the measurement M times. Accordingly, the SN-ratio obtained in a single measurement in the coded S-BOTDR is $M^{0.5} \times SNR_1$. A measurement repetition count required to achieve the target accuracy in the coded S-BOTDR is calculated by Eq. (78):

$$n_{rep} = \left(\frac{SNR_{rec}}{\sqrt{M}\,SNR_1}\right)^2 = \frac{1}{M}\left(\frac{SNR_{rec}}{SNR_1}\right)^2. \quad (78)$$

Put differently, the measurement repetition count necessary for achieving the target accuracy reduces to 1/M from that without using the coding.

Treatment of Polarization

The treatment of polarization is exactly the same as with the S-BOTDR, i.e., the spectrum is calculated by taking the sum of the spectra obtained for the two polarization components. Since the accumulation of the spectra obtained by repeating the measurement and the polarization processing both are simple summation operations, either may be carried out first as with the S-BOTDR.

Analysis of Coded S-BOTDR

<Point Spread Function of Cross-Spectrum>

A heterodyne-received signal $X^{(A,j)}(t, \nu)$ obtained by the scattering light from the probe light phase-modulated based on the code A is expressed by Eq. (79):

$$X^{(A,j)}(t, \nu) = i\kappa_1 e^{-2\pi i(\nu-\nu_0)t} \int_0^{L_f} f^{(A,j)}\left(t - \frac{2z}{\nu_g}\right)\overline{\zeta(z, t)}dz, \quad (79)$$

where ζ(z, t) is the first-order phonon process having a white spectrum in the space direction (z-direction) and a Lorentzian spectrum in the time direction (t-direction). The signals passed though the two kinds of low-pas filters are expressed by the following Eqs. (80), (81):

$$Y_1^{(A,j)}(t, \nu) = c_Y h_1(t) * X^{(A,j)}(t, \nu) \quad (80)$$
$$= i\kappa_2 \int_{-\infty}^{\infty} h_1(t - \tau)e^{-2\pi i(\nu-\nu_0)\tau}\int_0^{L_f} f^{(A,j)}\left(\tau - \frac{2z}{\nu_g}\right)\overline{\zeta(z, t)}dzd\tau$$

$$Y_2^{(A,j)}(t, \nu) = c_Y h_2(t) * X^{(A,j)}(t, \nu) \quad (81)$$
$$= i\kappa_2 \int_{-\infty}^{\infty} h_2(t - \tau)e^{-2\pi i(\nu-\nu_0)\tau}\int_0^{L_f} f^{(A,j)}\left(\tau - \frac{2z}{\nu_g}\right)\overline{\zeta(z, t)}dzd\tau.$$

In addition, regarding the above equations (79) to (81), see Non-Patent Document 4.

The expectation of the cross-spectrum $EV^{(A,j)}(t, \nu)$ calculated from these equations is expressed by Eq. (82):

$$EV^{(A,j)}(t, \nu) = EY_1^{(A,j)}(t, \nu)\overline{Y_2^{(A,j)}(t, \nu)} \quad (82)$$
$$= \gamma_R L(t, \nu) \stackrel{t,\nu}{*} \Psi^{(A,j)}(t, \nu).$$

In the above equation (82), L(t, ν) is a time-varying Lorentzian spectrum, and $\Psi^{(A,j)}(t, \nu)$ is a point spread function expressed by Eq. (83):

$$\Psi^{(A,j)}(t, \nu) = \xi_\tau[f^{(A,j)}(\tau)h_1(t-\tau)]\overline{\xi_\tau[f^{(A,j)}(\tau)h_2(t-\tau)]} \quad (83)$$
$$= \sum_{m=0}^{M-1}\sum_{m'=0}^{M-1} \xi_\tau\{[f_1(\tau - md) + \lambda_j A_m r f_2(\tau - md)]h_1(t-\tau)\} \times$$
$$\overline{\xi_\tau\{[f_1(\tau - m'd) + \lambda_j A_{m'} r f_2(\tau - m'd)]h_2(t-\tau)\}}$$
$$= \sum_{m=0}^{M-1}\sum_{m'=0}^{M-1} e^{-2\pi imd\nu}[F_{11}(t - md, \nu) + \lambda_j A_m r F_{12}(t - md, \nu)] \times$$
$$e^{-2\pi im'd\nu}\overline{[F_{12}(t - m'd, \nu) + \overline{\lambda_j} A_{m'} \cdot r F_{22}(t - m', \nu)]}$$
$$= \sum_{m=0}^{M-1}\sum_{m'=0}^{M-1} e^{-2\pi i(m-m')d\nu}F_{11}(t - md, \nu)\overline{F_{12}(t - m'd, \nu)} +$$
$$\lambda_j A_m r F_{12}(t - md, \nu)\overline{F_{12}(t - m'd, \nu)} +$$
$$\overline{\lambda_j} A_{m'} r\left[F_{11}(t - md, \nu)\overline{F_{22}(t - m'd, \nu)} +\right.$$
$$A_m A_{m'} r^2 F_{12}(t - md, \nu)\overline{F_{22}(t - m'd, \nu)}\Big],$$

where $F_{kl}(t, \nu)$ is defined by the following Eq. (84):

$$F_{kl}(t,\nu) = \xi_\tau[f_k(\tau)h_l(t-\tau)], \quad k,l = 1,2 \quad (84)$$

Synthetic spectra obtained from the four kinds of probe lights $f^{(A, j)}$ (j=1, 2, 3, 4), the expectation of the synthetic spectrum is expressed by Eq. (85):

$$EV_S^A(t, v) = \sum_{j=1}^{4} \lambda_j EV^{(A,j)}(t, v) \qquad (85)$$
$$= \gamma_R L(t, v) \overset{t,v}{*} \Psi_S^A(t, v),$$

The last function in the right hand of Eq. (85) can be replaced with the following Eq. (86):

$$\Psi_S^A(t, v) = \sum_{j=1}^{4} \Psi^{(A,j)}(t, v), \qquad (86)$$

and using Eqs. (6) to (8) gives the following Eq. (87):

$$\Psi_S^A(t, v) = 4 \sum_{m=0}^{M-1} \sum_{m'=0}^{M-1} e^{-2\pi i(m-m')dv} A_{m'} rF_{11}(t-md, v)\overline{F_{22}(t-m'd, v)}. \qquad (87)$$

Figure 11:
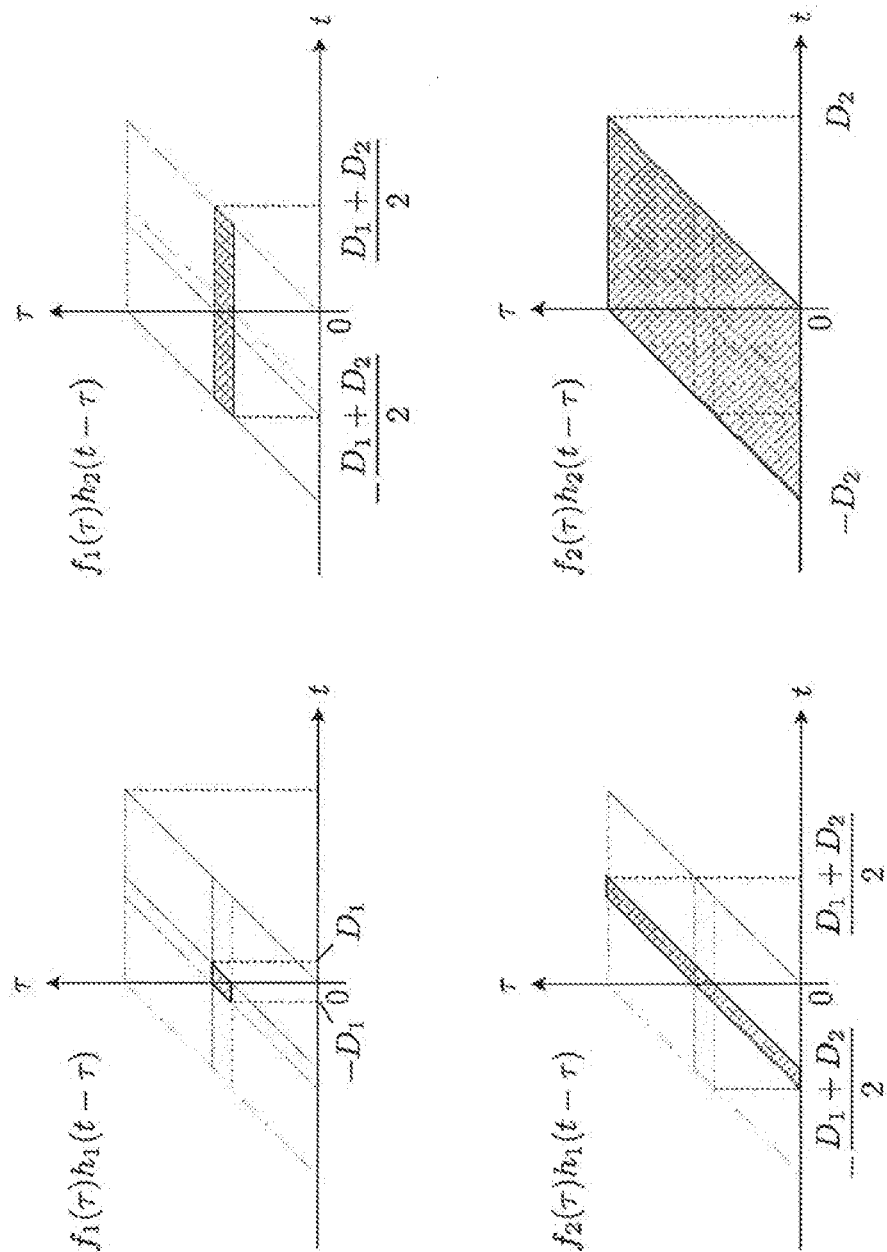
FIG. 11 shows diagrams for explaining requirement set for a point spread function in analysis of the coded S-BOTDR according to Embodiment 1.

Each term in the right side of Eq. (87) is examined. First, the supports of $f_k(\tau)h_1(t-\tau)$ in the right side of Eq. (84), that is, sets of points of the function having non-zero value are the hatched regions shown in FIG. 11. Defining the support of the function $f(t, \tau)$ as the following Eq. (88), the support of each $f_k(\tau)h_1(t-\tau)$ in the z-direction is bounded as seen from FIG. 11.

$$supp_t(f(t,\tau)) \overset{def}{=} \{t; f(t,\tau) \neq 0 \text{ for some } \tau\} \qquad (88)$$

Since $F_{k1}(t, v)$ is a Fourier transform in the z-direction, its support in the t-direction is the same as that of $f_k(\tau)h_1(t-\tau)$. Accordingly, when k=l=1 or =2, the following Eq. (89) holds:

$$supp_t(F_{11}(t,v))=[-D_1,D_1], \; supp_t(F_{22}(t,v))=[-D_2,D_2] \qquad (89).$$

From Eq. (89), the supports in the t-direction, of each term in right-side of Eq. (87) are expressed as the following Eq. (90):

$$\left.\begin{array}{l} supp_t F_{11}(t-md, v) = [md - D_1, md + D_1] \\ supp_t \overline{F_{22}(t-m'd, v)} = [m'd - D_2, m'd + D_2] \end{array}\right\} \qquad (90)$$

Since the requirement is $d \geq D_1 + D_2$ (see Eq. (65)) for the interval of the composite pulse train, it is found that the following Eq. (91) holds when $m \neq n'$:

$$F_{11}(t-md,v)\overline{F_{22}(t-m'd,v)}=0 \qquad (91).$$

Hence, the following Eq. (92) holds:

$$\Psi_S^A(t, v) = 4 \sum_{m=0}^{M-1} A_m rF_{11}(t-md, v)\overline{F_{22}(t-md, v)}. \qquad (92)$$

Likewise, synthetic spectra obtained from the four kinds of probe lights $f(B, j)$ (j=1, 2, 3, 4), the expectation of the synthetic spectrum can be expressed by Eq. (93), (94):

$$EV_S^B(t, v) = \gamma_R L(t, v) \overset{t,v}{*} \Psi_S^B(t, v) \qquad (93)$$

$$\Psi_S^B(t, v) = 4 \sum_{m=0}^{M-1} B_m rF_{11}(t-md, v)\overline{F_{22}(t-md, v)}. \qquad (94)$$

<Decode of Spectrum>

The two synthetic spectra are decoded using the Eqs. (95), (96):

$$EV_{dec,S}(t, v) = \sum_{m=0}^{M-1} \hat{R}[A_m EV_S^A(t+md, v) + B_m EV_S^B(t+md, v)] \qquad (95)$$
$$= \gamma_R L(t, v) \overset{t,v}{*} \Psi_{dec,S}(t, v)$$

$$\Psi_{dec,S}(t, v) = \sum_{m=0}^{M-1} \hat{R}[A_m \Psi_S^A(t+md, v) + B_m \Psi_S^B(t+md, v)] \qquad (96)$$
$$= 4r \sum_{m=0}^{M-1} \sum_{m'=0}^{M-1} (A_m A_{m'} + B_m B_{m'}) \times$$
$$\hat{R}\left[F_{11}(t+(m-m')d, v)\overline{F_{22}(t+(m-m')d, v)}\right]$$
$$= 4r \sum_{m=0}^{M-1} \sum_{k=-(M-1)}^{M-1} (A_m A_{m+k} + B_m B_{m+k})\hat{R}$$
$$[F_{11}(t-kd, v)\overline{F_{22}(t-kd, v)}]$$
$$= 8Mr\hat{R}[F_{11}(t, v)\overline{F_{22}(t, v)}].$$

The quotient of the lowest right side of Eq. (96) divided by 2M is the point spread function of the non-coded S-BOTDR. This implies that the coding renders the spectrum 2M-fold. However, since the standard deviation of noise is rendered $(2M)^{0.5}$-fold, the SN ratio becomes $(2M)^{0.5}$-fold. Accordingly, the coding gain becomes $(2M)^{0.5}$-fold.

While the space resolution of 10 cm was demonstrated by the spectrum synthesis in the S-BOTDR, ensuring this measurement accuracy needs to increase the repetition count of the measurement. But this poses a problem of taking time for the measurement. The problem can be overcome by employing the coded S-BOTDR using the technique of phase-modulating the probe lights on the basis of the coding, as described above. The coded S-BOTDR can improve the measurement accuracy by increasing the code length while keeping small the repetition count. Thus, it is expected that the measurement time for achieving the desired measurement accuracy can be significantly decreased. Hence, a simulation was conducted to verify the effect of the coded S-BOTDR. Results of the simulation are described next.

Simulation Conditions
<Optical Fiber>

Figure 12:
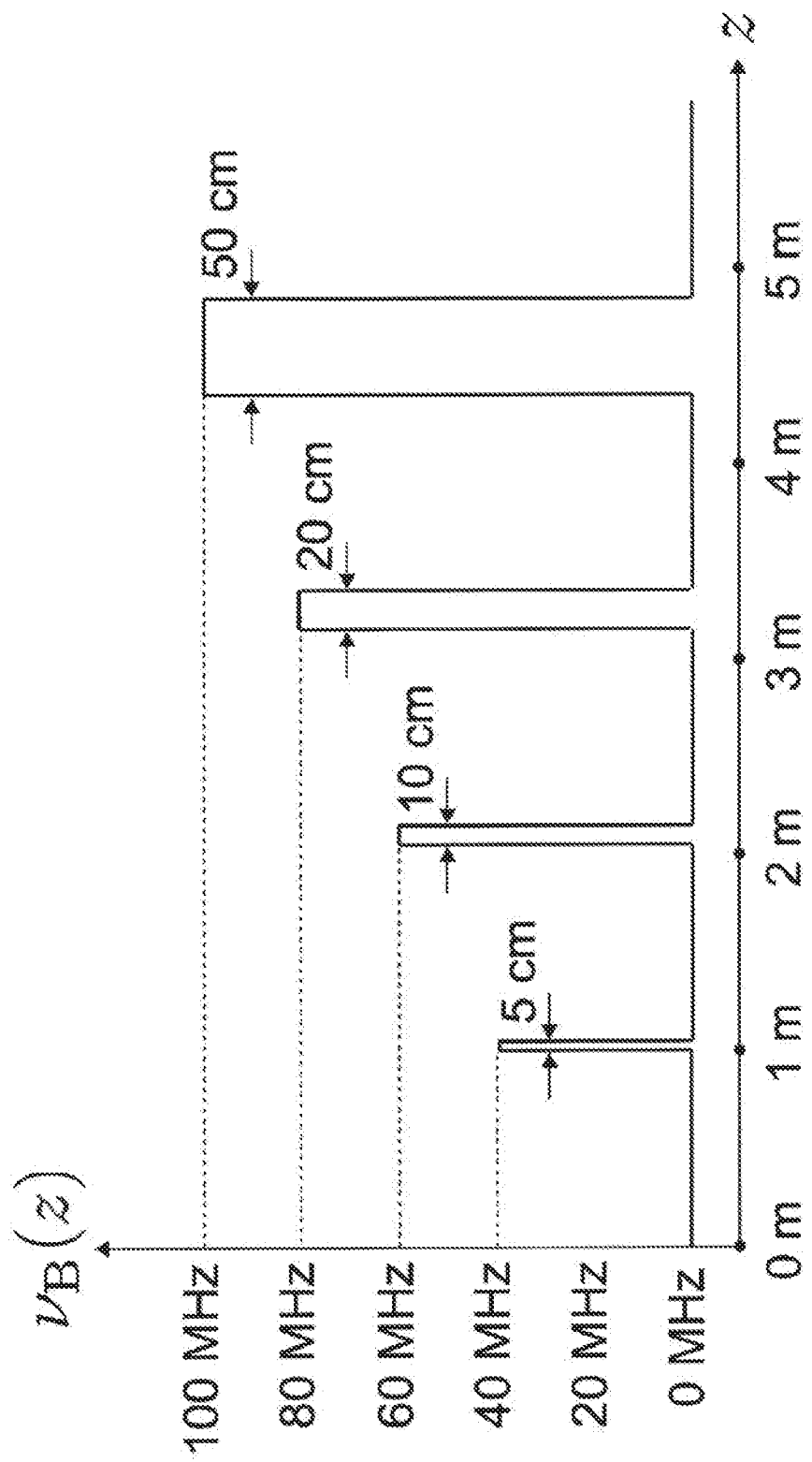
FIG. 12 is a diagram for explaining a condition for simulating the S-BOTDR according to Embodiment 1 using an optical fiber having different Brillouin frequency shifts.
Figure 14A:
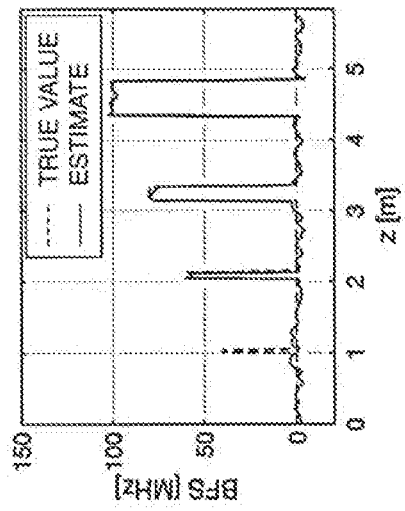
FIGS. 14A to 14D are graphs showing estimation results of the BFS simulated for cases of varying the code length of the coded S-BOTDR in a measurement repetition count of $2^{10}$.
Figure 14B:
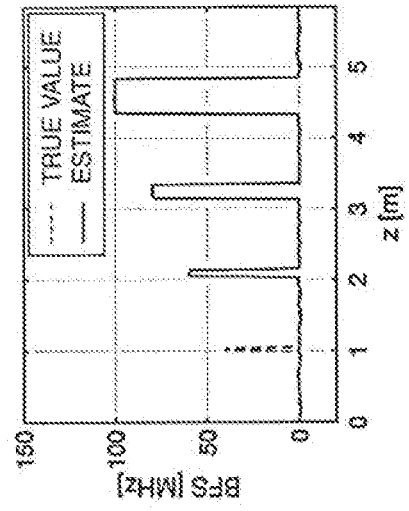
Figure 14C:
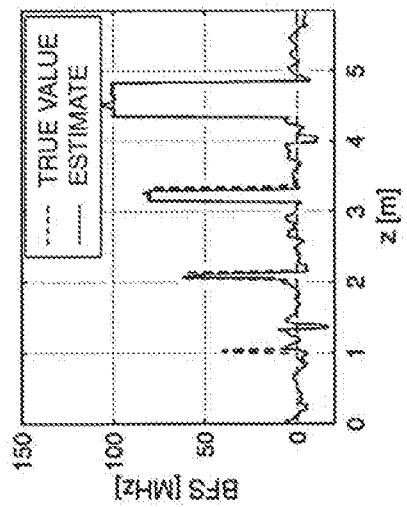
Figure 14D:
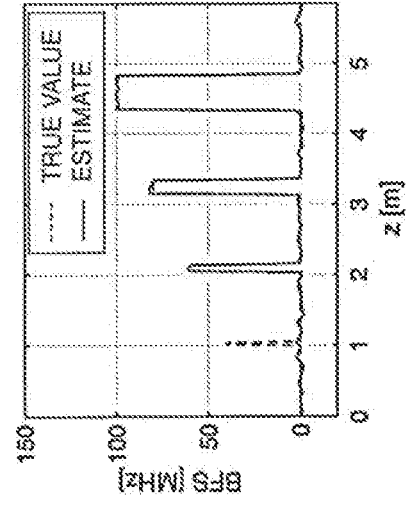

The simulation used an optical fiber shown in FIG. 12 that had a total length of 5.75 m and had four sections of different Brillouin frequency shift (BFS) inserted. The BSFs in order from the left of the figure were 40 MHz in the 5-cm section, 60 MHz in the 10-cm section, 80 MHz in the 20-cm section, and 100 MHz in the 50-cm section. Power attenuation due to round-tip of light was taken into account assuming that the 5.75-m-long optical fiber was connected to the distal end of a 5-km-long optical fiber. The coefficient of power attenuation was assumed to be 0.25 dB/km, that is, the 10-km round trip reduces the light power by 2.5 dB.

<Power of Probe Light and Magnitude of Noise>

To evaluate the influence of noise to the spectrum, both influences of fluctuations due to the scattered light and noise were taken into account in the simulation. The power of the probe light was set to $P_P=28$ dB (631 mW). The magnitude of noise was determined from an actual measured value. Specifically, the noise magnitude was set so that the SN ratio is 24.9 dB under the condition of a pulse power $P_P$ of 28 dB, a pulse duration of 5 ns, and a repetition count of $2^{16}$.

<S-BOTDR>

Major features of the S-BOTDR employed here is as follows.

(a) Probe lights: the four kinds of probe lights are composite pulses composed of the short pulse and the long pulse by overlapping with each other, and the phase differences between the short and the long pulses are four kinds: 0, $\pi/2$, $\pi$, $3\pi/2$.

(b) Duration of pulse: the short pulse duration is $D_1=1$ ns and the long pulse duration is $D_2=50$ ns.

<Coded S-BOTDR>

Major features of the coded S-BOTDR employed here is as follows.

(a) probe light: the four kinds of probe lights are phase-modulated based on the Golay codes and formed into the composite pulse train. Individual composite pulses are composed as with the S-BOTDR already described;

(b) duration of pulse: the short pulse duration is $D_1=1$ ns and the long pulse duration is $D_2=50$ ns;

(c) interval between composite pulses: the interval of the composite pulse train is d=76 ns;

(d) code length: the code length is M=1, 4, 16, 64 (M=1 is the case of the S-BOTDR).

<Method of Estimating BSF>

The BSF is approximated by fitting a parabola to the logarithm of the synthetic spectrum at each position z and the vertex of the parabola is determined to be an estimated value of the BSF.

Simulation Results

<S-BOTDR>

FIGS. 13A, 13B, 13C, 13D respectively show estimation results of the BFS simulated for four cases of changing the measurement repetition count to $2^{10}$ (=1024), $2^{12}$ (=4096), $2^{14}$ (=16384), and $2^{16}$ (=65536) in the S-BOTDR. Although the BSF in the section of 5 cm is not detected in any of the cases because the short pulse duration is 1 ns and the space resolution is 10 cm, the BSFs in the sections of 10 cm or longer are detected including their edges. This shows that the estimation performance is improved with increasing the measurement repetition count. Note that in order to obtain a sufficient estimation performance, the measurement needs to be repeated more than about $2^{16}$ times; however, it takes a long time for the measurement.

<Coded S-BOTDR>

FIGS. 14A, 14B, 14C, 14D respectively show estimation results of the BSF simulated for cases of changing the code length M to M=1, 4, 16, 64, with the number of measurement repetition count being fixed to be $2^{10}$ (=1024), in the coded S-BOTDR. As seen from the graphs, the effect of increasing the code length is similar to that of increasing the measurement repetition count in the S-BOTDR as shown by the graphs in FIGS. 13A, 13B, 13C, 13D.

<Estimation Error of BSF>

Figure 15:
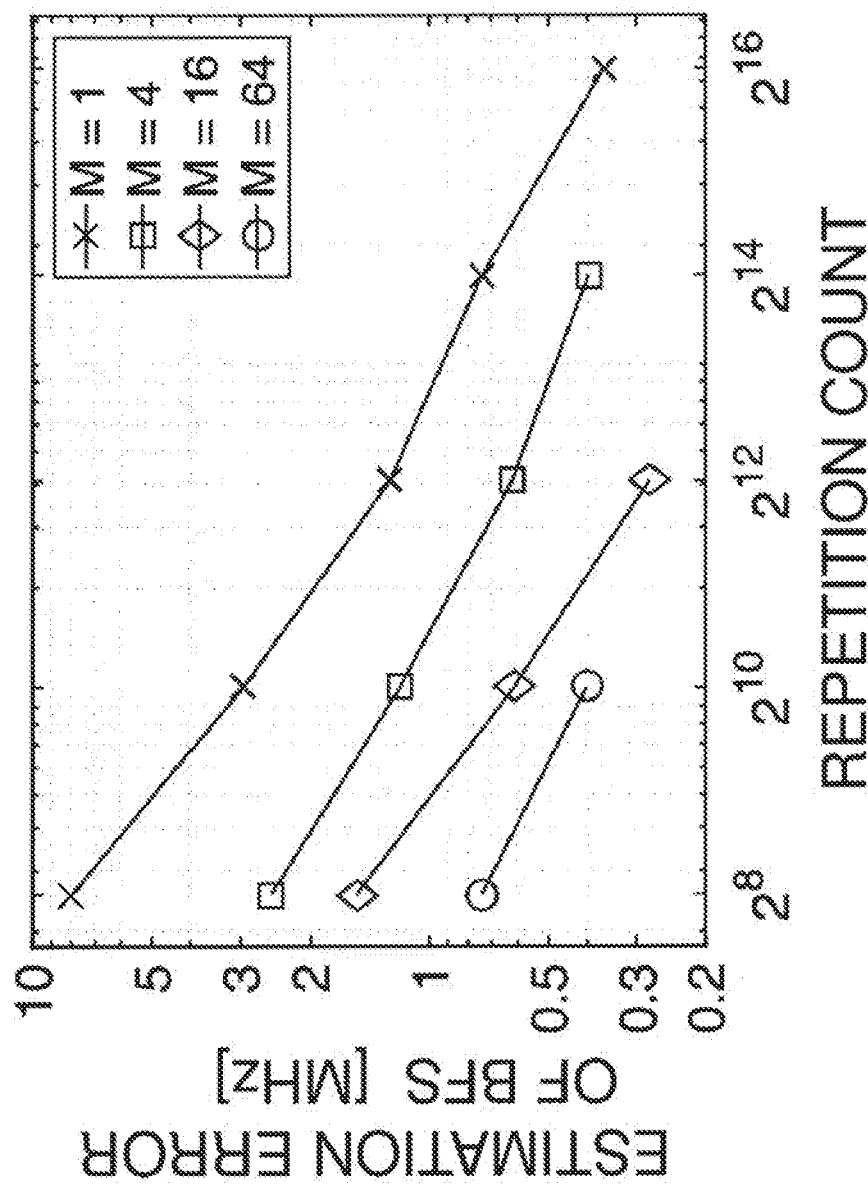
FIG. 15 is a graph showing estimation errors of the BFS simulated by varying the measurement repetition count for each code length of the coded S-BOTDR.

In order to quantitatively figure out estimation error of the BFS in the S-BOTDR and the coded S-BOTDR, an estimation error is simulated using 3-m-long optical fiber with no BSF change in place of that described in the subhead "Simulation Condition" by taking the route mean square (RMS) of difference between the true value and the BSF estimation value at each distance. FIG. 15 shows estimation errors of the BFS when the measurement repetition count is changed for each coded S-BOTDR. As is apparent from the figure, setting the code length n-fold gives the substantially the same effect as setting the repetition count n-fold. For example, setting the repetition count to $2^{10}$ and the code length to 64 brings about the same effect as setting the repetition count to $2^{16}$ and the code length to 1, which is a case of the S-BOTDR.

<Summary of Simulation Verification>

The effect of increasing the code length is confirmed by the simulation of the coded S-BOTDR including noise. If the fluctuations of the spectrum are only due to noise, increasing the code length of the coded S-BOTDR by M-fold results in that the SN ratio of the spectrum becomes $M^{0.5}$-fold and the estimation error of the BSF becomes $1/M^{0.5}$-fold. Similarly, setting the repetition count $n_{rep}$-fold results in that the SN ratio of the spectrum becomes $(n_{rep})^{0.5}$-fold and the estimation error of the BSF, $1/(n_{rep})^{0.5}$-fold. Since scattered light has fluctuations in itself and the fluctuations do not reduce even by increasing the code length of the coded BOTDR this may raise a concern that the coding effect is limited in the BOTDR. However, when power of Brillouin scattered light is very weak and fluctuation due to noise is much larger than that due to the Brillouin scattered light itself, such a coding effect as the examples shown by the simulation can be expected.

Embodiment 2

Next, Embodiment 2 is described below. Details of coding and its effect in a PSP-BOTDR technique for the Brillouin measurement are described with reference to the drawings and equations, as with Embodiment 1.

PSP-BOTDR

The PSP-BOTDR can also use the Golay code in coding, as with the S-BOTDR.

<PSP-BOTDR Technique>

Figure 16:
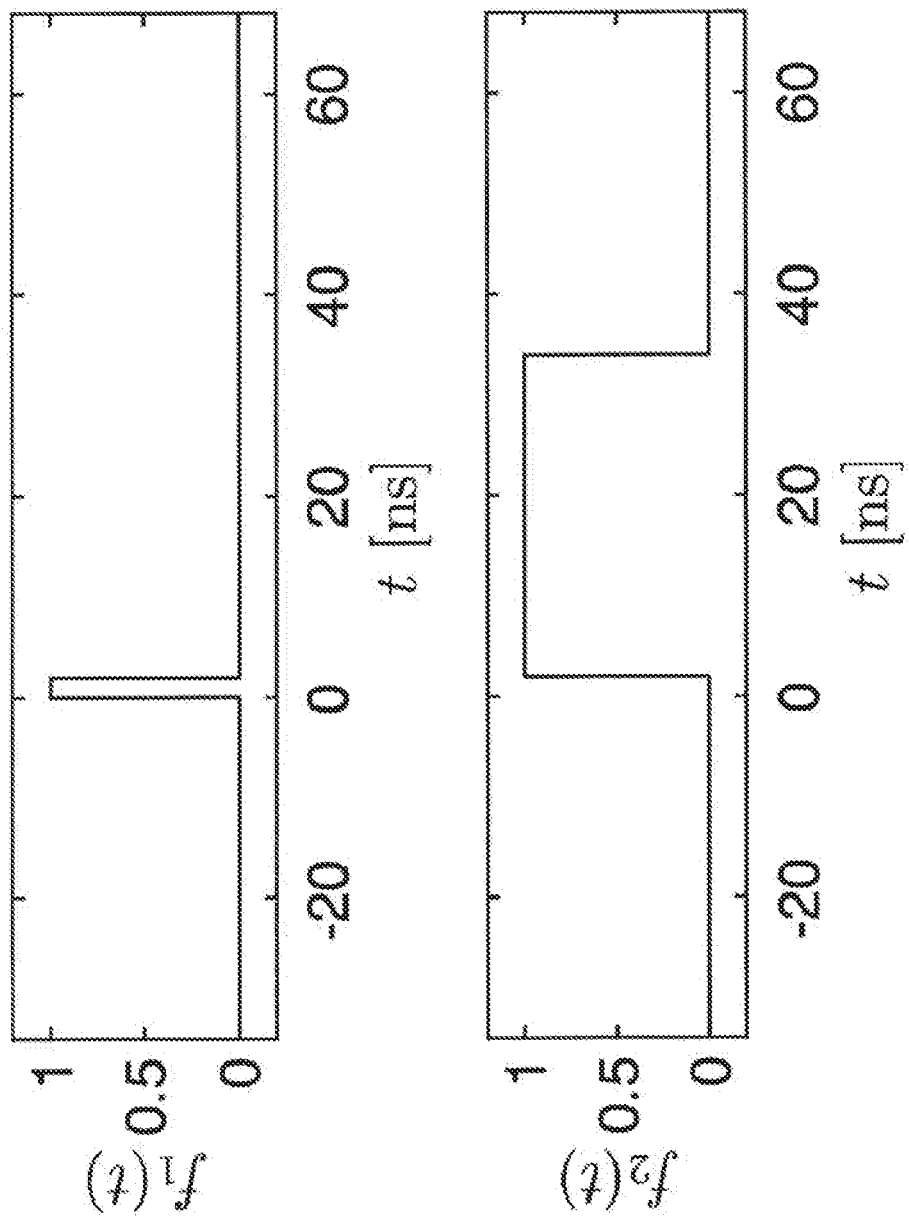
FIG. 16 is a diagram for explaining shapes of pulses of a probe light used in a PSP-BOTDR according to Embodiment 2.

A probe light for the PSP-BOTDR is composed of a short pulse $f_1(t)$ and a long pulse $f_2(t)$ (see FIG. 16) expressed by the following Eqs. (97), (98), respectively:

$$f_1(t)=I_{[0,D_1]}(t) \quad (97)$$

$$f_2(t)=I_{[D_1,D_1+D_2]}(t) \quad (98),$$

where $D_1$ and $D_2$ are the durations of the short pulse and the long pulse, respectively, as with the S-BOTDR. The probe light is expressed in the following forms as shown by Eq. (99), (100):

$$f^{(1)}(t)=f_1(t)+rf_2(t) \quad (99)$$

$$f^{(2)}(t)=f_2(t)-rf_2(t) \quad (100),$$

where r is an amplitude ratio between the short pulse and the long pulse. Two low-pass filters are also assumed to be matched filters for the short pulse and the long pulse of the probe light, as expressed by the following Eqs. (101), (102), respectively:

$$h_1(t)=f_1(-t) \quad (101)$$

$$h_2(t)=f_2(-t) \quad (102),$$

Figure 17:
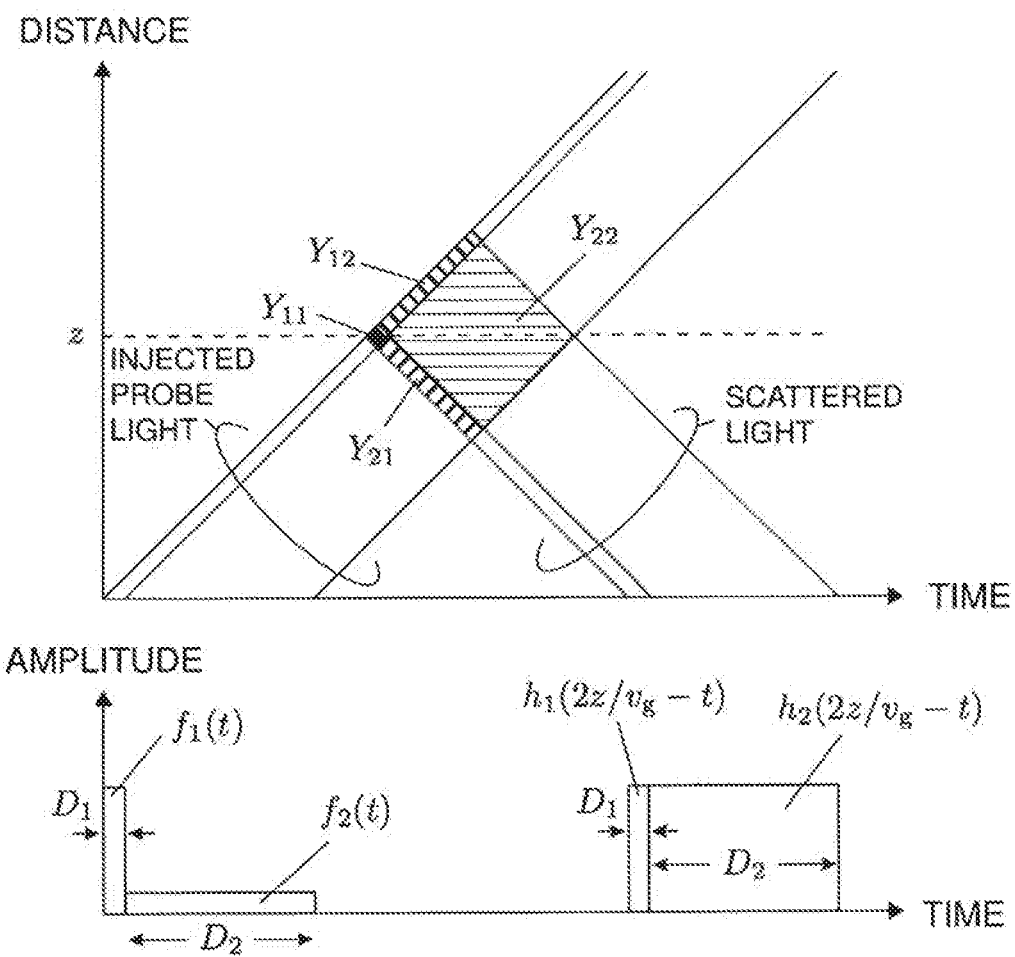
FIG. 17 is a diagram for explaining a relationship between the probe light and a scattered light in the PSP-BOTDR according to Embodiment 2.

FIG. 17 illustrates the injected probe light for the PSP-BOTDR and a scattered light therefrom in the two-dimensional time-space plane. Similar description as with FIG. 3 can also be made to FIG. 17. While the outputs $Y_{11}$, $Y_{12}$, $Y_{21}$, $Y_{22}$ shown in FIG. 3 are overlapped because the short and long pulses are overlapped, each output in FIG. 7 are distinguished as below because of no overlap between the short pulse and the long pulse. That is, $Y_{11}$ is the output from the left region indicated by black; $Y_{12}$ is the output from the upper-right region not including $Y_{11}$ among the strip regions, indicated by the stripe pattern; $Y_{21}$ is the output from the lower-right region not including $Y_{11}$, among the strip regions, indicated by the stripe pattern; and $Y_{22}$ is the output from the whole rhombus region not including $Y_{11}$, $Y_{12}$, $Y_{21}$.

<Measurement Procedure for PSP-BOTDR>

The measurement for the PSP-BOTDR is implemented, as with the S-BOTDR, in accordance with the following procedure of the steps (a) to (e). It is noted that the steps (a) to (d) are carried out for j=1, 2, . . . , p, and for $\nu = \nu_1$, $\nu_2, \ldots, \nu_k$, where k is the number of extracted frequency components.

(a) forming the probe light having shape of $f^{(j)}(t)$ from the laser light from the laser light source and injecting the probe light into the optical fiber;

(b) optically heterodyne-receiving a Brillouin scattered light by the optical heterodyne receiver with the reference laser light from the laser light source, and further downshifting with the high frequency signal from the local oscillator by the heterodyne receiver, to output a signal $X^{(j)}(t)$;

(c) passing the signal $X^{(j)}(t)$ through the two low-pass filters $h_1(t)$, $h_2(t)$ corresponding to the short pulse and the long pulse, to extract frequency components $Y_1^{(j)}(t, \nu)$, $Y_2^{(j)}(t, \nu)$ having frequency $\nu$, respectively;

(d) calculating the cross-spectrum $V^{(j)}(t, \nu)$ of the signals after passed through the respective filters $h_1(t)$, $h_2(t)$ using Eq. (19), which is shown in the description of the subhead "<Measurement Procedure of S-BOTDR using Cross-Spectrum>";

(e) calculating the PSP-BOTDR spectrum $V_{PSP}(t, \nu)$ of the PSP-BOTDR using the following Eq. (103):

$$V_{PSP}(t,\nu) = \hat{R}[V^{(1)}(t,\nu) - V^{(2)}(t,\nu)] \quad (103),$$

The procedure is repeated many times, to accumulate and average the spectrum. In addition, an FFT can be used for the step (c) in the procedure, as with the S-BOTDR.

Coding Method in PSP-BOTDR

The PSP-BOTDR uses two kinds of composite pulses combined with the short pulse and the long pulse. Each composite pulse is coded with the two Golay code sequences into a train of four kinds of composite pulses. For example, using a Golay code of M=4 leads to four code sequences as expressed by the following Eq. (104):

$$\left. \begin{array}{l} A, +: \{1 \quad 1 \quad 1 \quad -1\} \\ A, -: \{-1 \quad -1 \quad -1 \quad 1\} \\ B, +: \{-1 \quad -1 \quad 1 \quad -1\} \\ B, -: \{1 \quad 1 \quad -1 \quad 1\} \end{array} \right\}. \quad (104)$$

<Formation of Probe Light>

From the above, the prove lights may be formed of two kinds of composite pulse trains composed of a non-phase modulated optical pulse and a phase-modulated optical pulses. The two kinds of pulse trains are expressed with the interval of the composite pulse trains d and the number M of pulses by the following Eqs. (105), (106):

$$\left\{ \begin{array}{l} f^{(A,+)}(t) = \sum_{m=0}^{M-1} [f_1(t-md) + A_m rf_2(t-md)] \\ f^{(A,-)}(t) = \sum_{m=0}^{M-1} [f_1(t-md) + A_m rf_2(t-md)] \end{array} \right\} \quad (105)$$

$$\left\{ \begin{array}{l} f^{(B,+)}(t) = \sum_{m=0}^{M-1} [f_1(t-md) + B_m rf_2(t-md)] \\ f^{(B,-)}(t) = \sum_{m=0}^{M-1} [f_1(t-md) - B_m rf_2(t-md)] \end{array} \right\}. \quad (106)$$

While the long pulse is phase-modulated with the Golay code in this pulse formation, the short pulse may be phase-modulated with the long pulse remaining intact. In this case, the two kinds of pulse trains are expressed by the following Eqs. (107), (108):

$$\left\{ \begin{array}{l} f^{(A,+)}(t) = \sum_{m=0}^{M-1} [A_m f_1(t-md) + rf_2(t-md)] \\ f^{(A,-)}(t) = \sum_{m=0}^{M-1} [-A_m f_1(t-md) + rf_2(t-md)] \end{array} \right\} \quad (107)$$

$$\left\{ \begin{array}{l} f^{(B,+)}(t) = \sum_{m=0}^{M-1} [B_m f_1(t-md) + rf_2(t-md)] \\ f^{(B,-)}(t) = \sum_{m=0}^{M-1} [-B_m f_1(t-md) + rf_2(t-md)] \end{array} \right\}. \quad (108)$$

Figure 18:
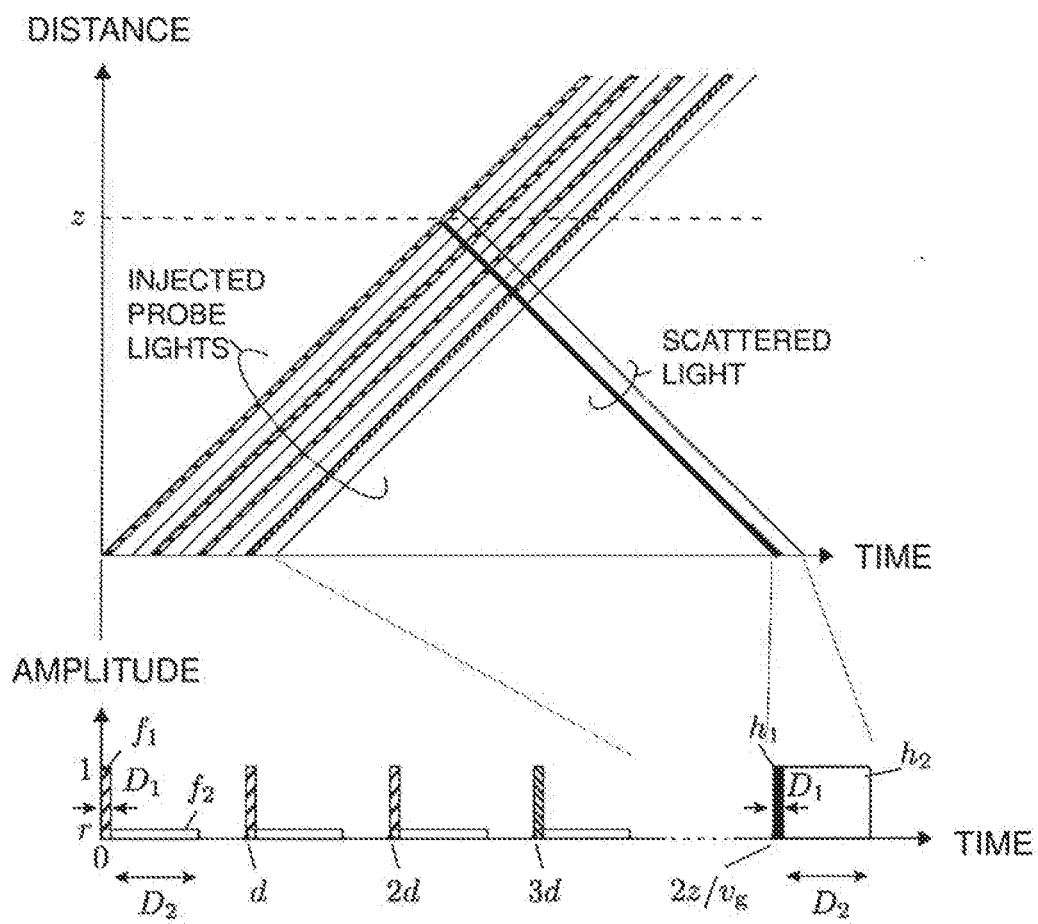
FIG. 18 is a diagram for explaining a relationship between injected probe lights and a scattered light in the coded PSP-BOTDR according to Embodiment 2.

FIG. 18 illustrates a relationship between the probe lights for the coded PSP-BOTDR and a scattered light therefrom. Here, the short pulse is phase-modulated with M=4.

<Length and Interval of Pulse Train>

The length of the pulse train is the same as with the S-BOTDR. Restriction on coherency is only for the individual composite pulses, accordingly there is no limit on the length of the code sequence.

Figure 19:
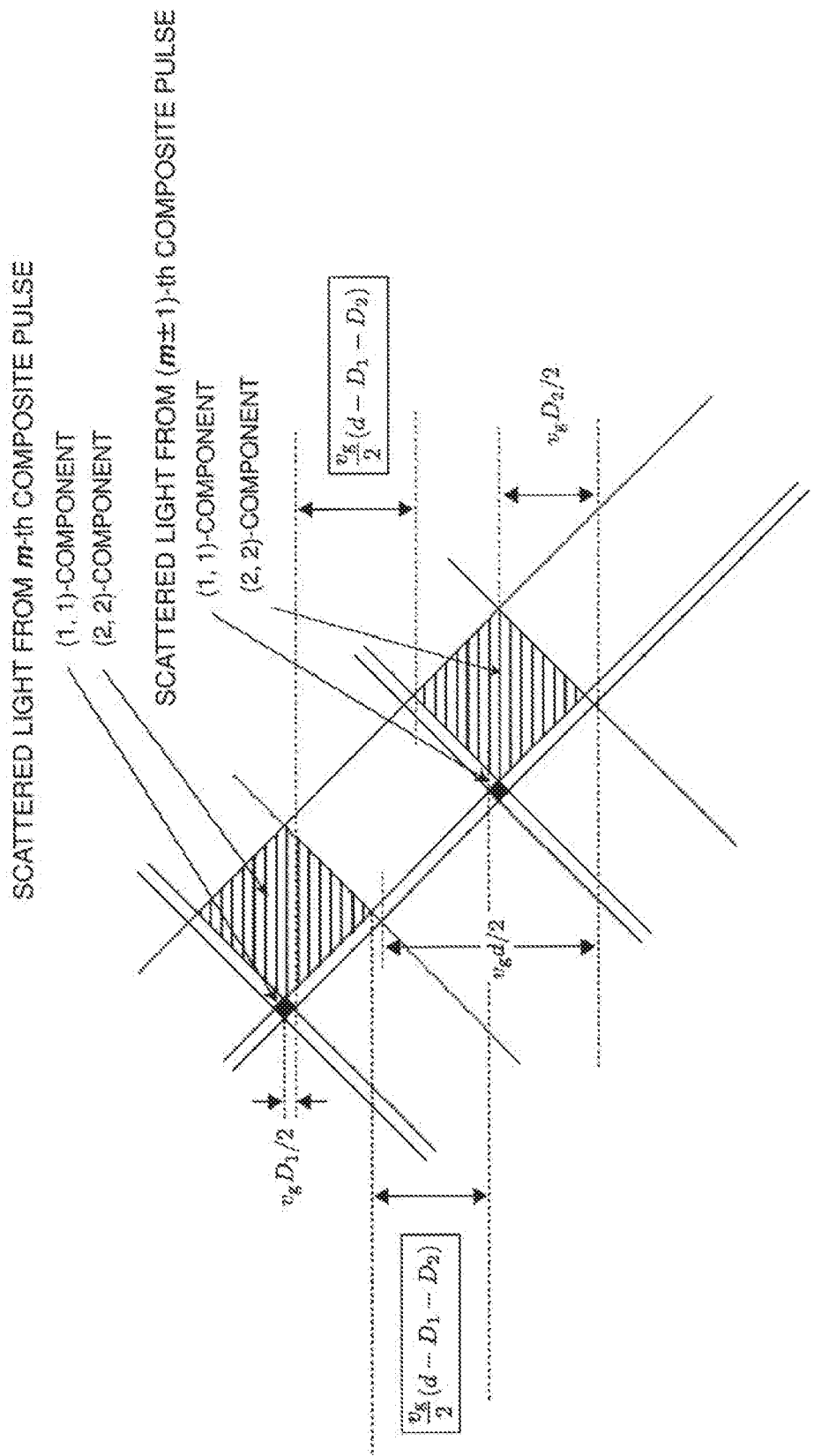
FIG. 19 is diagram for explaining the lengths of and the interval between injected composite pulses in a scattered light for the coded PSP-BOTDR according to Embodiment 2.

Next, the interval d of the composite pulse train is described. Also in the coded PSP-BOTDR, there is the requirement that the outputs $Y_{11}$, $Y_{22}$ shown in FIG. 17 of scattered lights from adjacent composite pulses need to be separated in the z-direction, as with the coded S-BOTDR. The requirement for the coded PSP-BOTDR is expressed by the inequality (109) below with the composite-pulse train interval d, as shown in FIG. 19:

$$\frac{v_g}{2}(d - D_1 - D_2) \geq 0. \quad (109)$$

Accordingly, the requirement for the interval d to satisfy is given by the following inequality (110):

$$d \geq D_1 + D_2 \quad (110).$$

For example, d needs to be 34 ns or longer for $D_1 = 2$ ns and $D_2 = 32$ ns.

Signal Processing of Coded PSP-BOTDR

The frequency is ordinary scanned in the measurement. A signal processing method for each frequency $\nu = \nu_1$, $\nu_2, \ldots, \nu_k$ is described here. Data of a returned scattered light generated by each injected probe light is expressed as $X^{(j)}(t, \nu)$, which is heterodyne-received and then AD-converted and sampled, where j=A, B indicates the kinds of the probe lights, and $t_n=n\Delta t (n=0, 1, 2, \ldots, N)$ is the discrete time and $\Delta t$ is the sampling time.

<Low-Pass Filter>

As with the S-BOTDR, outputs of the two kinds of low-pass filters for the sequences (A, +), (A, −) and the sequences (B, +), (B, −) are expressed by Eq. (111) and Eq. (112), respectively:

$$\begin{cases} Y_1^{(A,j)}(t_n, v) = \sum_{l=n_0}^{n_0+N_1-1} X^{(A,j)}(t_{n+l}, v), & j = +, - \\ Y_2^{(A,j)}(t_n, v) = \sum_{l=0}^{N_2-1} X^{(A,j)}(t_{n+l}, v), & j = +, - \end{cases} \quad (111)$$

$$\begin{cases} Y_1^{(B,j)}(t_n, v) = \sum_{l=n_0}^{n_0+N_1-1} X^{(B,j)}(t_{n+l}, v), & j = +, - \\ Y_2^{(B,j)}(t_n, v) = \sum_{l=0}^{N_2-1} X^{(B,j)}(t_{n+l}, v), & j = +, - \end{cases} \quad (112)$$

<Cross-Spectrum>

As with the S-BOTDR, the cross-spectrum for the sequences (A, +), (A, −) is calculated from the outputs of the two kinds of low-pass filters using the previously-described Eq. (113) below:

$$V^{(A,j)}(t_n,v) Y_1^{(A,j)}(t_n,v) \overline{Y_2^{(A,j)}(t_n,v)}, j=+,- \quad (113),$$

and that for the sequences (B, +), (B, −) is also calculated similarly using the following Eq. (114):

$$V^{(B,j)}(t_n,v) Y_1^{(B,j)}(t_n,v) \overline{Y_2^{(B,j)}(t_n,v)}, j=+,- \quad (114).$$

<Synthesis of Spectrum>

The synthetic spectra corresponding to the sequence A and the sequence B of the Golay code are calculated using the following upper Eq. (115) and the lower Eq. (116), respectively:

$$\begin{cases} V_{PSP}^A(t_n, v) = V^{(A,+)}(t_n, v) - V^{(A,-)}(t_n, v) \\ V_{PSP}^B(t_n, v) = V^{(B,+)}(t_n, v) - V^{(B,-)}(t_n, v) \end{cases} \quad (115)$$

<Decoding by means of Correlation>

The Decoding is performed by taking the correlation as expressed by the following Eq. (116):

$$V_{dec,PSP}(t_n, v) = \left| \sum_{m=0}^{M-1} (A_m V_{PSP}^A(t_{n+mq}, v) + B_m V_{PSP}^B(t_{n+mq}, v)) \right|, \quad (116)$$

where q (=d/$\Delta t$) is the number of discrete times (sampling points) in the interval d between the composite pulses. The decoding also synthesizes automatically the spectrum.

<Accumulation by Repetition of Measurement>

The improvement effect by the coding renders the SN ratio $M^{0.5}$-fold as with the coded S-BOTDR. Since the improving effect is equivalent to that of the accumulation of M times, the PSP-BOTDR reduces the repetition count to $n_{rep}/M$, where $n_{rep}$ is a repetition count necessary for improving the SN ratio in the PSP BOTDR. Note that, the repetition count necessary for reducing the signal fluctuation does not change even if the coding is performed.

<Treatment of Polarization>

The treatment of polarization is exactly the same as with the S-BOTDR, i.e., the synthetic spectrum is calculated finally by taking the sum of the spectra of the two polarization components. Since the accumulation of the spectra obtained by repeating the measurement and the polarization processing both are simple summation operations, either may be carried out first, as with the S-BOTDR. In the above, the details and the effect of applying the coding using the Golay code to the Brillouin measurement are described. In the followings, a description is made as to details and an effect of applying, to the Brillouin measurement, coding using an Hadamard matrix, which is an effective technique other than the coding using the Golay code.

Embodiment 3

Coding Using Hadamard Matrix

While the coding technique using the Golay code and its correlation has been described, a technique using the Hadamard Matrix without using the correlation is described hereinafter. The technique using the Hadamard matrix can also bring about the same effect as using the Golay code. A technique of improving the SN ratio in the S-BOTDR using the Hadamard matrix is described below.

<Hadamard Matrix>

The Hadamard matrix is a square matrix that has binary elements of +1 and whose each row and each column are orthogonal to each other. That is, an n-th order Hadamard matrix satisfies the following Eq. (117):

$$HH^T = nI_n \quad (117),$$

where $I_n$ is the n-th unit matrix. From the above Eq. (117), the inverse matrix is given as Eq. (118):

$$H^{-1} = \frac{1}{n} H^T. \quad (118)$$

Moreover, the Hadamard matrix H has the characteristic in that even multiplying any row by −1 or any column by −1 also results in an Hadamard matrix. Hence, it can be assumed that the matrix H has elements of the first row and those of the first column being all 1 (This is referred to as "normalized Hadamard matrix"). Since an i-th (i≠1) row of the normalized Hadamard matrix is orthogonal to the first row, the numbers of elements having a value of 1 and −1 in the i-th row need to be equal to each other. Accordingly, n needs to be an even number.

In a case of n≥3, the number of elements having a value of 1 in an i-th (i≠1) row of the normalized Hadamard matrix H and the number of elements having a value of 1 or −1 in a j-th (j≠1, i) row thereof are expressed as $N_{++}$, $N_{+-}$, respectively. Similarly, the numbers of elements having a value of 1 or −1 in an i-th (i≠1, i) row and in a j-th (j≠1, i) row are expressed as $N_{-+}$, $N_{--}$, respectively. Since the i-th row and the j-th row are orthogonal to the first row, this leads to $N_{++}+N_{+-}=n/2$ and $N_{-+}+N_{--}=n/2$, and since the i-th row and the j-th row are orthogonal to each other, this leads to $N_{++}+N_{--}=n/2$. Solving these simultaneously results in $N_{++}=N_{+-}=N_{-+}=N_{--}=n/4$. Accordingly, n needs to be a multiple of 4.

Given an n-th order Hadamard matrix $H_n$, the matrix expressed by Eq. (119) is a 2n-th order Hadamard matrix:

$$\begin{bmatrix} H_n & H_n \\ H_n & -H_n \end{bmatrix}. \quad (119)$$

Utilizing the above (applying the Sylvester's construction) leads to a matrix expressed by the following Eq, (120):

$$H_1 = [1], \quad (120)$$

$$H_2 = \begin{bmatrix} 1 & 1 \\ 1 & -1 \end{bmatrix},$$

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

$$H_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} : .$$

<Formation of Probe Light>

The S-BOTDR uses, as the probe lights, p ($\geq$3) kinds of composite pulses formed by combining the short pulse and the long pulse. In coding the S-BOTDR using an Hadamard matrix, while the composite pulse train is phase-modulated on the basis of each row of the Hadamard matrix, the phase-modulation is made to either one of the short pulse or the long pulse as with the coded S-BOTDR. Letting the dimension of the Hadamard matrix be NH (this value needs to be a multiple of either 2 or 4 as previously described), the probe lights are $pN_H$ combinations of the composite pulse train in total. The amplitude of each probe light is given by the following Eq. (121):

$$f_k^{(j)}(t) = \sum_{m=1}^{N_H} [f_1(t-(m-1)d) + H_{k,m}\lambda_j rf_2(t-(m-1)d)] \quad (121)$$

$$j = 1, 2, \ldots, p,$$

$$k = 1, 2, \ldots, N_H,$$

where $f_1(t)$ and $f_2(t)$ are amplitudes of the short pulse and the long pulse previously shown by Eqs. (1) and (2), respectively; $H_{k,m}$ (k, m=1, 2, ..., $N_H$) are elements of the Hadamard matrix; $\lambda_j$ (j=1, 2, ..., p) are points on the unit circle previously shown by Eq. (4); r is an amplitude ratio of the long pulse to the short pulse; and d is the interval between the composite pulses.

<Technique Using Hadamard Matrix>

A coding technique using the Hadamard matrix for the S-BOTDR is implemented in accordance with the following procedure of steps (a) to (g). It is noted that the steps (a) to (e) are carried out for l=1, 2, ..., $N_H$, and for j=1, 2, ..., p for each value of l, and for $v=v_1, v_2, \ldots, v_k$, where k is the number of extracted frequency components.

(a) forming a probe lights having a shape of $f_k^{(j)}(t)$ from the laser light from the laser light source and injecting the probe light into the optical fiber;

(b) optically heterodyne-receiving a Brillouin scattered light with the reference light from the laser light source, and further downshifting with the high frequency signal from the local oscillator by the heterodyne receiver, to output a signal $X^{(j)}(t)$;

(c) passing the signal $X^{(j)}(t)$ through the two low-pass filters $h_1(t)$, $h_2(t)$ corresponding to the short pulse and the long pulse;

(d) calculating the cross-spectrum $v_k^{(j)}(t, v)$ of the filtered signals $Y_{1,k}^{(j)}(t, v)$, $Y_{2,k}^{(j)}(t, v)$ using the following Eq. (122):

$$V_k^{(j)}(t,v) = Y_{1,k}^{(j)}(t,v)\overline{Y_{2,k}^{(j)}(t,v)} \quad (122);$$

(g) calculating an S-BOTDR spectrum $V_{s,k}(t, v)$ using the following Eq. (123):

$$V_{S,k}(t, v) = \hat{R}\left(\sum_{j=1}^{p} \lambda_j V_k^{(j)}(t, v)\right); \quad (123)$$

(f) calculating a synthetic spectrum from the calculated S-BOTDR spectrum using the inverted Hadamard matrix by the following Eq. (124):

$$V_{S,H^{-1},m}(t, v) = \sum_{l=1}^{N_H} (H^{-1})_{m,k} V_{S,k}(t, v) \quad (124)$$

$$= \frac{1}{N_H} \sum_{l=1}^{N_H} H_{k,m} V_{S,k}(t, v),$$

$$m = 1, 2, \ldots, N_H;$$

and (g) calculating finally the synthetic spectrum by accumulating and averaging the synthetic spectra obtained by repeating the procedure using Eq. (125):

$$V_{S,H^{-1}}(t, v) = \frac{1}{N_H} \sum_{m=1}^{N_H} V_{S,H^{-1},m}(t+(m-1)d, v). \quad (125)$$

The operations of accumulating the spectrum by repeating the measurement and of taking the sum of spectra obtained for the two polarization components are the same as with the S-BOTDR. Using the Hadamard matrix technique results in the SN-ratio improvement effect of $(N_H)^{0.5}$-fold, which is the same as using the Golay code technique, comparing to those effects in the same measurement repetition count.

As has been described above, applying any coding technique of Embodiments 1 to 3, which is considered to be best for Brillouin measurement, allows for improving measurement accuracy, such as improvement of SN ratio, compared to conventional techniques. It should be noted that each embodiment of the present application may be freely combined or appropriately modified and omitted within the scope and the spirit of the application. For example, while the above descriptions are made of the technique and the system for phase-modulating only long pulse on the basis of a code, a method and a system, not limited to those, that phase-modulate only long pulse on the basis of the code brings about the same effect.

REFERENCE NUMERALS

1: laser light source;
2: short pulse generator;
3: long pulse generator;
4: pulse generator;
5: phase shifter;
6: phase selector;
7: pulse combiner;
8: probe light generator;
9: coupler;
10: optical heterodyne receiver;
11: local oscillator;
12: heterodyne receiver;
13: A-D converter; and
14: signal processor.

The invention claimed is:

1. A Brillouin scattering measurement method that uses a composite pulse train composed of composite pulses with an interval of the composite pulse train being longer than a phonon lifetime; each composite pulse being formed of two kinds of optical pulses having different durations generated from a laser light from a laser source, by combining both optical pulses as a pair to be located at respective predetermined time positions; and injects the composite pulse train into one end of an optical fiber provided to a measurement object, to measure physical quantities of the measurement object from frequency shift change of Brillouin backscattered light generated by the composite pulse train in the optical fiber, the Brillouin scattering measurement method comprising the steps of:
   phase-modulating one of the optical pulses on the basis of two Golay code sequences;
   optically heterodyne-receiving the Brillouin backscattered light from each composite pulse with a reference light from the laser light source, to output as a first signal;
   heterodyne-receiving the first signal with a signal having a predetermined frequency and then passing the heterodyne-received signal through two kinds of low-pass filters corresponding to the optical pulses, to output the filtered signals as second signals;
   calculating, for each Golay code sequence, cross-spectrum of one of the second signals and a complex conjugate signal of the other second signal;
   calculating a synthetic spectrum from the calculated cross-spectrum; and
   decoding the synthetic spectrum.

2. The Brillouin scattering measurement method of claim 1, wherein measurement of the Brillouin backscattered light is repeated $2^{10}$ to $2^{14}$ times, and polarization detected by the optically heterodyne-receiving is polarization-treated by splitting the detected signal into a polarization-component signal in a direction of an injection plane and a polarization-component signal in a direction orthogonal to the injection plane, and by calculating respective spectra from the polarization-component signals obtained from each measurement, to accumulate the polarization-component spectra, to calculate the synthetic spectrum.

3. The Brillouin scattering measurement method of claim 2, wherein the synthetic spectrum is calculated by performing phase correction determined from a Kerr effect coefficient, power of the optical pulses, and a distance to a measurement point of the measurement object, and then the phase corrected synthetic spectrum is accumulated or the synthetic spectrum is calculated in a complex form to take an absolute value of the complex-form synthetic spectrum without performing the phase correction and then the absolute value is polarization-treated and accumulated, to calculate finally a synthetic spectrum.

4. A Brillouin scattering measurement method that uses a composite pulse train composed of composite pulses with an interval of the composite pulse train longer than a phonon lifetime; each composite pulse being formed of two kinds of optical pulses having different durations generated from a laser light from a laser source, by combining both optical pulses as a pair to be located at respective predetermined time positions; and injects the composite pulse train into one end of an optical fiber provided to a measurement object, to measure physical quantities of the measurement object from frequency shift change of Brillouin backscattered light generated by the composite pulse train in the optical fiber, the Brillouin scattering measurement method comprising the steps of:
   phase-modulating one of the optical pulse on the basis of values of each row of a Hadamard matrix;
   optically heterodyne-receiving the Brillouin backscattered light from each composite pulse with a reference light from the laser light source;
   heterodyne-receiving the first signal with a signal having a predetermined frequency and then passing the heterodyne-received signal through two kinds of low-pass filters corresponding to the optical pulses, to output the filtered signals as second signals;
   calculating cross-spectrum of one of the second signals and a complex conjugate signal of the other second signal;
   calculating a synthetic spectrum from the calculated cross-spectrum; and
   accumulating the synthetic spectrum using an inverted Hadamard matrix and averaging the accumulated synthetic spectrums.

5. The Brillouin scattering measurement method of claim 4, wherein measurement of the Brillouin backscattered light is repeated $2^{10}$ to $2^{14}$ times, and polarization detected by the optically heterodyne-receiving is polarization-treated by splitting the detected signal into a polarization-component signal in a direction of an injection plane and a polarization-component signal in a direction orthogonal to the injection plane, and by calculating respective spectra from the polarization-component signals obtained from each measurement, to accumulate the polarization-component spectra, to calculate the synthetic spectrum.

6. The Brillouin scattering measurement method of claim 5, wherein the synthetic spectrum is calculated by performing phase correction determined from a Kerr effect coefficient, power of the optical pulses, and a distance to a measurement point of the measurement object, and then the phase corrected synthetic spectrum is accumulated or the synthetic spectrum is calculated in a complex form to take an absolute value of the complex-form synthetic spectrum without performing the phase correction and then the absolute value is polarization-treated and accumulated, to calculate finally a synthetic spectrum.

7. A Brillouin scattering measurement system configured to measure a frequency shift of Brillouin backscattered light, comprising:
   a laser light source;
   a probe light generator configured to generate a probe light for measuring physical quantities of a measurement object, the probe light generator including:
      a pulse generator generating, from a laser light from the laser light source, two kinds of optical pulses having durations different from each other;

a phase selector having a plurality of pieces of phase information based on two Golay code sequences, and selecting a piece of the phase information to be sent;

a phase shifter phase-modulating one of the optical pulses to impart to the one optical pulse the pieces of phase information received from the phase selector; and a pulse combiner combining as a pair the phase-modulated pulse and the other pulse and locates both pulses at respective predetermined time positions, an optical heterodyne receiver optically heterodyne-receiving with a reference light from the laser light source a Brillouin backscattered light generated by the probe light injected into an optical fiber provided to the measurement object;

a heterodyne receiver heterodyne-receiving the signal output from the optical heterodyne receiver with a signal having a predetermined frequency from an oscillator; and a signal processor passing the signal output from the heterodyne receiver through low-pas filters corresponding to the short pulse and the long pulse, and calculating respective spectra of the filtered signals, to calculate a cross-spectrum of the spectra.

8. The Brillouin scattering measurement system of claim 7, wherein The duration of the optical pulse is set equal to or shorter than one twentieth of a coherence time of the laser that is defined by the inverse of product of a linewidth of the laser and $\pi$, and an interval between adjacent pulses of the composite pulse train is set equal to or long than a sum of the short pulse duration and the long pulse duration.

* * * * *